United States Patent [19]

Urushidani et al.

[11] Patent Number: 5,022,025
[45] Date of Patent: Jun. 4, 1991

[54] SELF-ROUTING SWITCH AND ITS ROUTING METHOD

[75] Inventors: Shigeo Urushidani, Tokorozawa; Hitoshi Imagawa, Kunitachi, both of Japan

[73] Assignee: Nippon Telegraph and Telephone Corporation, Tokyo, Japan

[21] Appl. No.: 309,647

[22] Filed: Feb. 13, 1989

[30] Foreign Application Priority Data

Feb. 17, 1988 [JP] Japan .................................. 63-34613
Jan. 9, 1989 [JP] Japan ...................................... 1-1326

[51] Int. Cl.[5] .......................................... H04Q 11/04
[52] U.S. Cl. .................................................. 370/60
[58] Field of Search ...................... 370/60, 60.1, 94.1, 370/94.2, 94.3

[56] References Cited

U.S. PATENT DOCUMENTS 4,731,878  3/1988  Vaidya ................................. 370/60
4,761,780  8/1988  Bingham et al. ..................... 370/60

FOREIGN PATENT DOCUMENTS

86/03355  6/1986  PCT Int'l Appl. .
87/00373  1/1987  PCT Int'l Appl. .

OTHER PUBLICATIONS

"The Load-Sharing Banyan Network", by Lea, IEEE, Transactions on Computers, vol. C-35, No. 12, 12/86, pp. 1025-1034.

"Packet Switching Networks for Multiprocessors and Data Flow Computers", by Chin et al., IEEE Transactions on Computers, vol. C-33, No. 11, 11/84, pp. 991-1003.

Primary Examiner—Douglas W. Olms
Assistant Examiner—Wellington Chin
Attorney, Agent, or Firm—Pollock, Vande Sande & Priddy

[57] ABSTRACT

A self-routing switch in which a plurality of switching stages, each having a plurality of switching elements, are sequentially connected by substitute links, wherein additional two input terminals and additional two output terminals are provided in each switching element of at least the last plural switching stages of the switch, and the output terminals and input terminals of the same line position between these last plural switching stages are connected by equivalent links, respectively. When information data appended with a destination address and judge times, as routing information, is input into the switch, one of the bits in the destination address is selected as a judge bit on the basis of the judge times, and the output terminal to which the information data is to be output is selected according to the value of the judge bit.

4 Claims, 21 Drawing Sheets

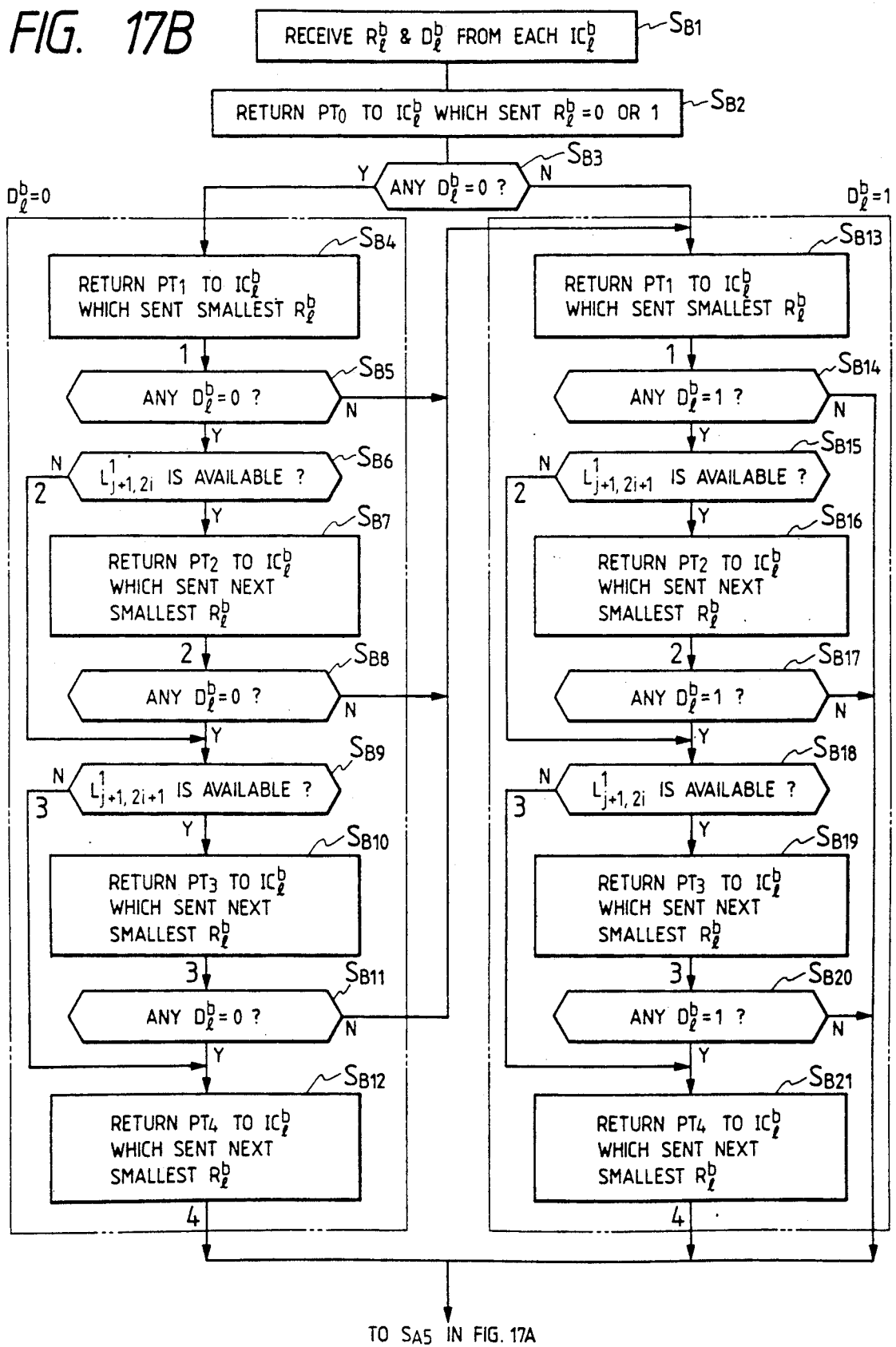

SELF-ROUTING SWITCH AND ITS ROUTING METHOD

BACKGROUND OF THE INVENTION

The present invention relates to a self-routing switch and, more particularly, to a self-routing switch which effects distributed control by hardware and is suitable for use as an interconnection network for multiprocessor communications in a computer or a switch for fast packet switching.

FIG. 1 is a diagram showing an example of a conventional switching circuit (with 16 input lines and 16 output lines) known as a typical self-routing switch (see C. Wu and T. Fung, "Routing techniques for a class of multistage interconnection networks", 1978 Int'l Conf. Parallel Processing, pp. 197–205, for example).

In FIG. 1 reference characters $IT_0$ to $IT_{15}$ indicate input lines, $OT_0$ to $OT_{15}$ output lines, $HI_0$ to $HI_{15}$ routing information inserters, $HE_0$ to $HE_{15}$ routing information eliminators, and $E_{1,0}$ to $E_{4,7}$ circuits (hereinafter referred to as switching elements) which determine the output line to which information data to be transferred is to be output in accordance with a destination address appended to the information data.

The switching elements $E_{j,0}$ to $E_{j,7}$ (where $j=1$ to 4) constitute a jth switching stage $ST_j$. Reference characters $L_{1,0}$ to $L_{5,15}$ denote links which interconnect the routing information inserters, the routing information eliminators and the switching elements. Input links to the jth switching stage $ST_j$ are sequentially identified by $L_{j,0}$ to $L_{j,15}$ from the top. The links from each switching stage to the next one are provided so that any routing information inserter HI can be connected to any routing information eliminator HE.

The routing from each routing information inserter HI to a desired routing information eliminator HE is determined by a destination address contained in routing information appended to information data. The routing information inserter HI inserts routing information into information data which is supplied thereinto from an input line, and the routing information eliminator HE eliminates the routing information from the information data.

The routing information contains the address of a routing information eliminator $HE_p$ which is a specified destination of information data and is represented in a binary form, $(d_3, d_2, d_1, d_0)$, where $p = d_3 \cdot 2^3 + d_2 \cdot 2^2 + d_1 \cdot 2^1 + d_0 \cdot 2^0$. Consequently, p takes an arbitrary value from 0 to 15 in this instance. It is predetermined, as a promise, that the switching element $E_{j,i}$ of the jth switching stage $ST_j$ outputs information data to an upper or lower outgoing link depending whether the bit $d_{4-j}$ in the bit string $(d_3, d_2, d_1, d_0)$ is "0" or "1". In the following description this bit $d_{4-j}$ may therefore be referred to as judge bit for routing operation by each switching element $E_{j,i}$ in the jth stage $ST_j$. After passing through all the switching stages information data reaches the specified routing information eliminator $HE_p$.

Such a conventional self-routing switch as described above is easy of control, because the routing path is determined uniquely. However, when a link contention by a plurality of information data occurs in the switching network, some of the information data must be abandoned or buffered into a buffer of a limited capacity; consequently, as the scale of the switching network enlarges, the number of information data which can reach the output line side decreases, or a delay time of information data increases. This leads to the defect that the throughput (i.e. the output line utilization factor) of the switching network is very low.

This defect is experienced also in other conventional switching networks which differ from the above-said one in link wiring algorithm alone. There has also been proposed a switching network of the type in which no link contention occurs unless a plurality of information data are directed to the same output trunk (see J. Y. Hui and E. Arthurs, "A broadband packet switch for integrated transport", IEEE J. Select. Areas Commun., vol. SAC-5, pp. 1264–1273, Oct. 1987, for instance), but a very large number of stages of preceding circuits for avoiding the contention are required.

In U.S. Pat. No. 4,661,947 there is disclosed a self-routing switch in which switching elements in each switching stage are connected in pairs by internal links so that if a link contention occurs between two pieces of information data in one of the switching elements of a certain pair, one of the pieces of information data is transferred to the other switching element for its routing operation. However, this arrangement does not so much improve the overall throughput of the switch either.

SUMMARY OF THE INVENTION

It is therefore an object of the present invention to provide a self-routing switch which obviates the above-mentioned defects of the prior art and which does not call for any preceding circuits for preventing the link contention but attains significantly increased throughput (the output line utilization factor) of the switching network.

To attain the above objective, according to the present invention, in a self-routing switch in which $N (=2^n$, where n is an integer equal to or greater than 2) input lines and N output line are accommodated, a plurality of switching stages and links for interconnecting them are interposed between the input and the output lines, and a transfer of information data from an arbitrary input line to a desired output line via the switching stages is performed using routing information attached to the information data, wherein the routing information is composed of address information of plural bits which represents a destination address of the information data being transferred, and bit position specifying information (referred to also as judge times) which specifies, for each stage, a particular bit position in the plural bits of the address information which should be checked for its value in determining one of the outgoing links to which the information data is to be output. The self-routing switch is equipped with:

routing information inserters which are provided between the input lines and a first one of the switching stages and each of which corresponds to one of the input lines and inserts, as the routing information, into information data to be transferred information composed of the address information and an initial value of the bit position specifying information (the judge times);

the switching stages respectively including switching elements, each of which selects from the plural bits of the address information the bit position specified by the bit position specifying information, determines one of the outgoing links according to the value of the specified bit, and processes the bit position specifying information through use of a predetermined algorithm; and routing information eliminators which are provided between the last one of the switching stages and the output lines and each of which corresponds to one of the output lines and eliminates the routing information attached to information data transferred thereto.

According to the present invention, the judge times is combined with the destination address for selecting the route of information data as mentioned above. In case of a link contention, the judge times of the information data last in the contention is reset so that routing of the defected information data is resumed from the next switching stage. Information data for which routing operation has been completed is output, so as to maintain its position which the information data has reached. Consequently, an increase in the number of switching stages will increase the throughput accordingly.

BRIEF DESCRIPTION OF THE DRAWINGS

FIG. 17B is a flowchart showing the control procedure in the central controller CC in FIG. 16;

DESCRIPTION OF THE PREFERRED EMBODIMENTS

Figure 1:
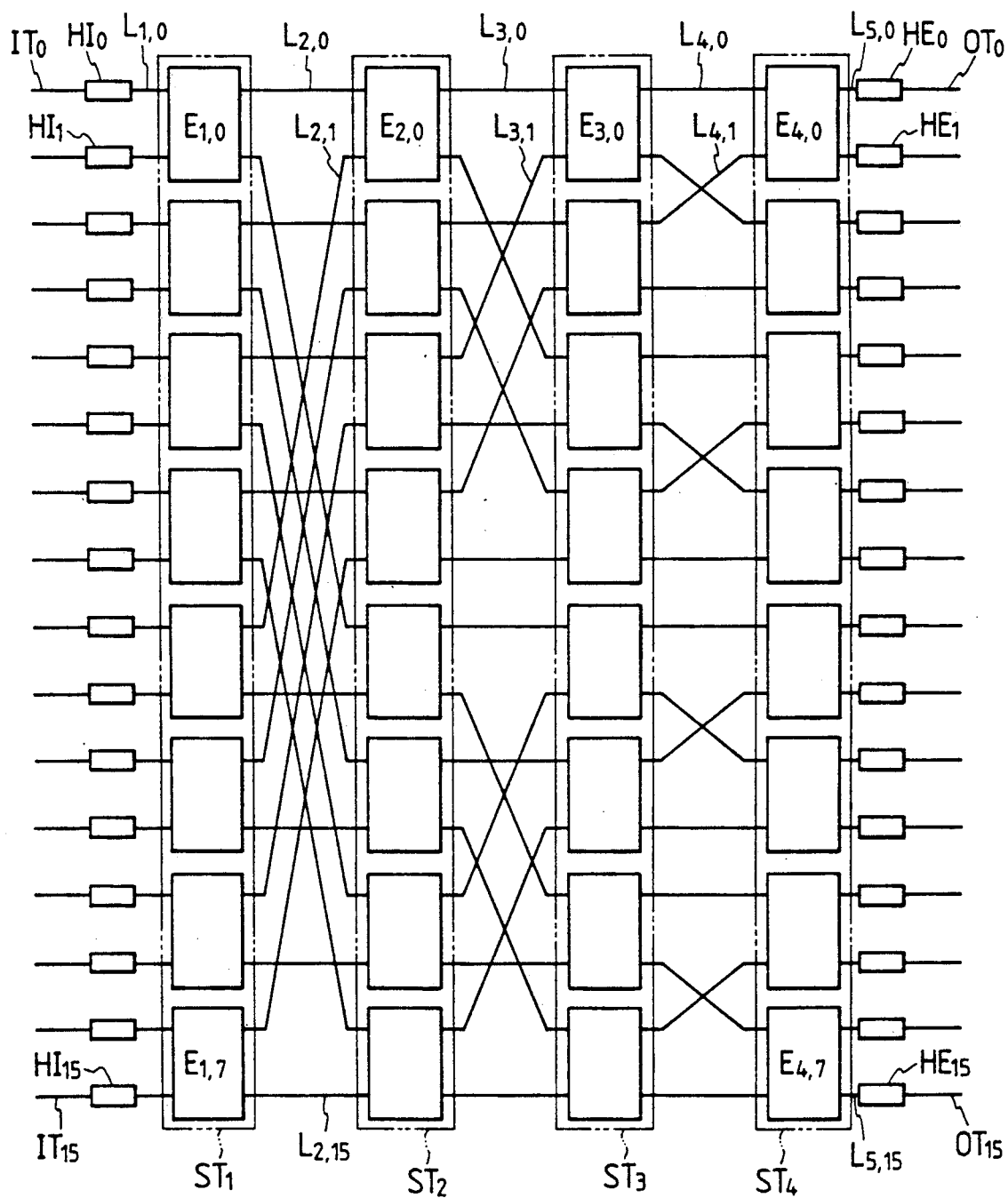
FIG. 1 is a block diagram showing a typical self-routing switch heretofore employed.
Figure 2:
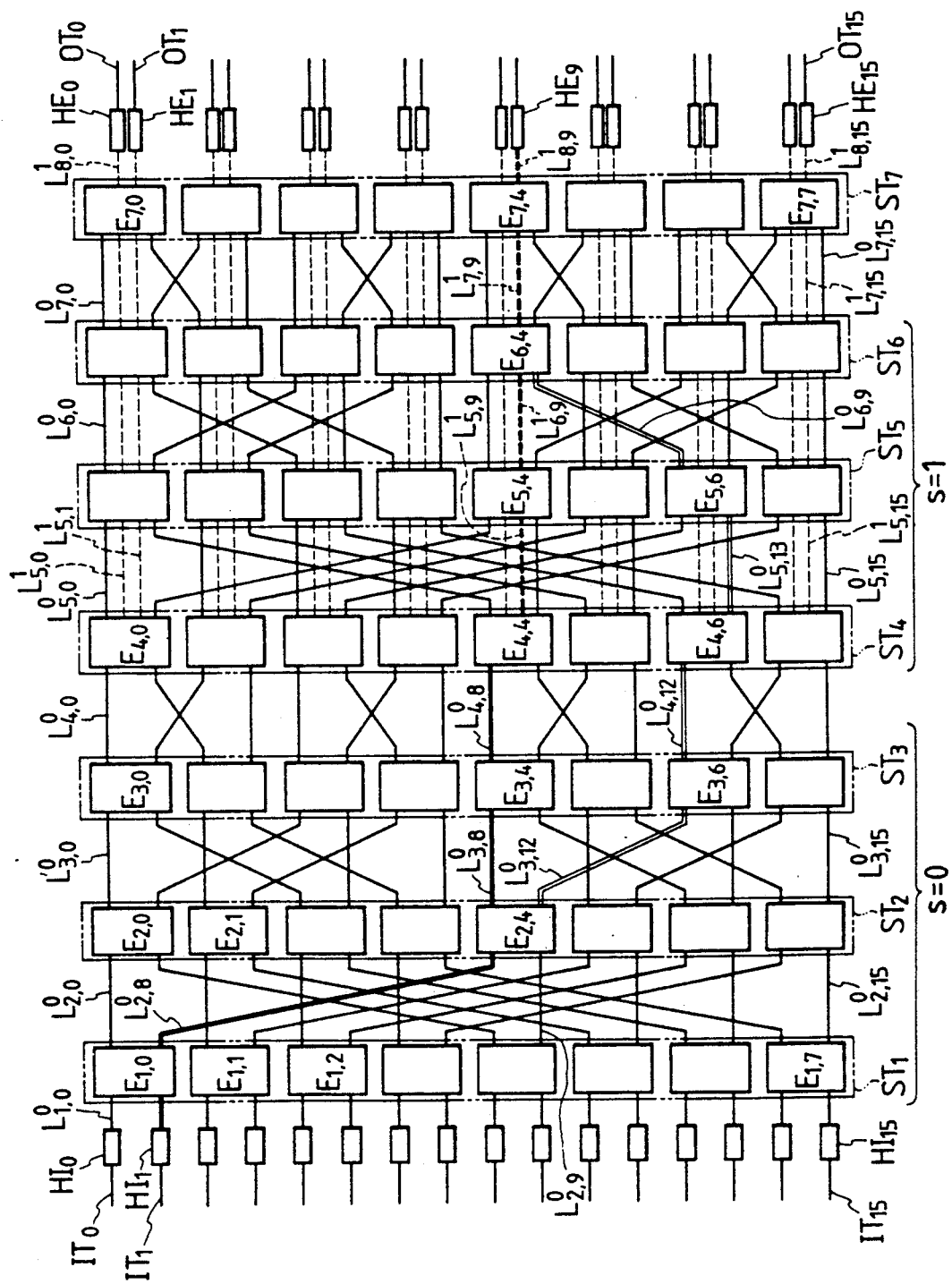
FIG. 2 is a block diagram illustrating an embodiment of the self-routing switch of the present invention.

FIG. 2 is a diagram explanatory of a first embodiment (16 input lines and 16 output lines) of the present invention.

In FIG. 2, reference characters $IT_0$ to $IT_{15}$ indicate input lines, $OT_0$ to $OT_{15}$ output lines, $HI_0$ to $HI_{15}$ routing information inserters, $HE_0$ to $HE_{15}$ routing information eliminators, $E_{1,0}$ to $E_{7,7}$ circuits (hereinafter referred to as switching elements) each of which determines the selection of output link for information data in accordance with routing information attached thereto, and $ST_1$ to $ST_7$ switching stages. The switching elements $E_{j,0}$ to $E_{j,15}$ form a switching stage $ST_j$ (j=1 to 7 in this example).

Reference characters $L_{1,0}{}^0$ to $L_{7,15}{}^0$ and $L_{5,0}{}^1$ to $L_{8,15}{}^1$ denote links interconnecting the routing information inserters and eliminators and the switching elements. The solid-lined links (hereinafter referred to as substitute links) which are input to the switching stage $ST_j$ are sequentially marked with $L_{j,0}{}^0$ to $L_{j,15}{}^0$ from the top and the broken-lined links (hereinafter referred to as equivalent links) are sequentially marked with $L_{j,0}{}^1$ to $L_{j,15}{}^1$ from the top. In this embodiment, the equivalent links are provided in the fourth switching stage $ST_4$ and the subsequent ones, that is, j>5 for the equivalent links.

Figure 2A:
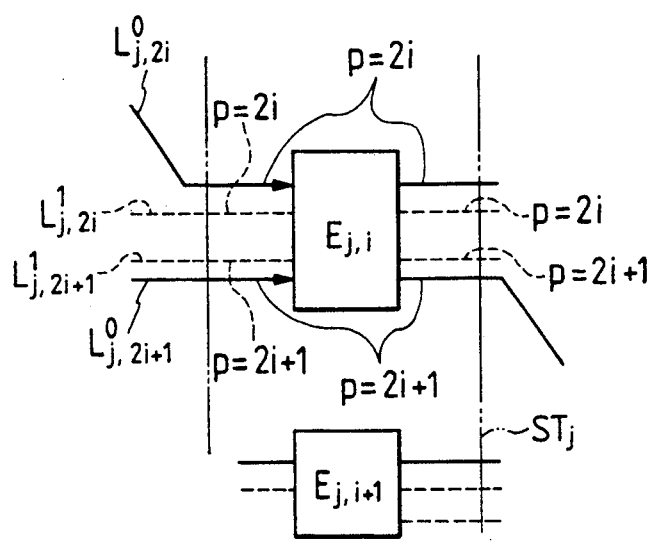
FIG. 2A is a diagram for explaining the positions p of input and output terminals of each switching element $E_{j,i}$ in FIG. 2.

The line positions p of input and output terminals for the same type of links of each switching element $E_{j,i}$ (where i=0, 1, ... 7) are their numbers counted from the top of the stage and the numbers p are each represented four bits ($p_3$, $p_2$, $p_1$, $p_0$). The terminal at by binary the line position p counted to the substitute link is represented by ($p_3$, $p_2$, $p_1$, $p_0$)$^0$ and the terminal at the line position p connected to the equivalent link by ($p_3$, $p_2$, $p_1$, $p_0$)$^1$. In FIG. 2A there is shown the relationship between the position i of each switching element $E_{j,i}$ in the switching stage $ST_j$ and the position p of each the input and output terminals of the switching element $E_{j,i}$. In the following description the solid-lined output terminals and the broken-lined output terminals may sometimes be called output substitute links and output equivalent links, respectively.

A description will be given first of how the switching elements are interconnected by the substitute links.

The routing information inserter $HI_p$ at the line position $p=(p_3, p_2, p_1, p_0)$ is connected by the substitute link $L_{1,p}{}^0$ to the input terminal at the same position $p=(p_3, p_2, p_1, p_0)^0$ in the first switching stage $ST_1$. The output terminal at the line position $p=(p_3, p_2, p_1, p_0)$ in the first switching stage $ST_1$ is connected to the input terminal at a line position $p=(p_0, p_2, p_1, p_3)^0$ by the substitute link $L_{2,p}{}^0$ (i.e. a terminal position represented by rearranging the bit positions of four bits, which represent the output terminal position in the first switching stage $ST_1$, into $p_0, p_2, p_1, p_3$) Similarly the output terminal at the line position $p=(p_3, p_2, p_1, p_0)^0$ in the second switching stage $ST_2$ is connected to the input terminal at the line position $p=(p_3, p_0, p_1, p_2)^0$ in the third switching stage $ST_3$ by the substitute link $L_{3,p}{}^0$, the output terminal at the line position $p=(p_3, p_2, p_1 p_0)^0$ in the third switching stage $ST_3$ is connected to the input terminal at the line position $p=(p_3, p_2, p_0, p_1)^0$ in the fourth switching stage $ST_4$ by the substitute link $L_{4,p}{}^0$, and the output terminal at the line position $p=(p_3, p_2, p_1, p_0)^0$ in the fourth switching stage $ST_4$ is connected to the input terminal at the line position $p=(p_0, p_2, p_1, p_3)^0$ in the fifth switching stage $ST_5$ by the substitute link $L_{5,p}{}^0$. The input and output terminals in the subsequent switching stages are also connected in a likewise manner.

In the connection of the switching elements by the equivalent links, the output terminal at the line position $p=(p_3, p_2, p_1p_0)^1$ in the switching stage $ST_j$ (where $j \geq 4$) is connected by the equivalent link $L_{j+1,p}{}^1$ to the input terminal at the same line position $p=(p_3, p_2, p_1, p_0)^1$ in the $(j+1)$th switching stage $ST_{j+1}$. The output terminal at the line position $p=(p_3, p_2, p_1, p_0)^1$ in the final switching stage $ST_7$ is connected to the routing information eliminator $HE_p$ at the corresponding line position $p=(p_3, p_2, p_1, p_0)$.

While the embodiment of FIG. 2 has 16 input lines and 16 output lines, the self-routing switch of the present invention, in general, N (where $N=2^n$, n being an integer equal to or greater than 2) input lines and N output lines and includes $\{m(n-1)+e\}$ switching stages, where m is a desired fixed integer equal to or greater than 1 and e is a fixed integer in the range of $1 \leq e \leq n-1$. Now, an arbitrary jth one of the first to $\{(m(n-1)+e\}$th srages will be represented by $j=\{s(n-1)+k\}$. Here, s and k are variables corresponding to j, k takes an arbitrary integer in the range of $1 \leq k \leq n-1$ with respect to each value of $s=0, 1, \ldots m-1$ and when $s=n$, k assumes an arbitrary integer in the range of $1 \leq k \leq e$. In this instance, the routing information inserter $HI_p$ at the line position $p=(p_{n-1}, p_{n-2}, \ldots, p_0)$ is connected to the input terminal at the ine position $P=(p_{n-1}, p_{n-2}, \ldots, p_0)^0$ in the first switching stage $ST_1$ by the substitute link $L_{1,p}{}^0$; the output terminal at the line position $p=(p_{n-1}, p_{n-2}, \ldots, p_0)^0$ in the $j=\{s(n-1)+k\}$th switching stage $ST_j$ is connected to the input terminal at the line position $p=(p_{n-1}, p_{n-2}, \ldots, p_{n-k}, p_0, p_{n-k-1}, \ldots, p_{n-k})^0$ in the $(j+1)=\{s(n-1)+k+1\}$th switching stage $ST_{j+1}$ by the substitute link $L_{j+1,p}{}^0$; the output terminal at the line position $p=(p_{n-1}, p_{n-2}, \ldots, p_0)^1$ in the jth switching stage $ST_j$ (where $j \geq n$) is connected by the equivalent link $L_{j+1,p}{}^1$ to the input terminal at the same line position $p=(p_{n-1}, p_{n-2}, \ldots, p_0)^1$ in the $(j+1)$th switching stage $ST_{j+1}$; and the output terminal at the line position $p=(p_{n-1}, p_{n-2}, \ldots, p_0)^1$ in the final switching stage is connected to the routing information eliminator $HE_p$ at the same line position $p=(p_{n-1}, p_{n-2}, \ldots, p_0)$.

Next, the operation of the switching network will be described.

The routing from arbitrary one of the routing information inserters $HI_0$ to $HI_{15}$ to a desired one of the routing information eliminators $HE_0$ to $HE_{15}$ is determined by routing information including destination information (a destination address) and judge times information (remaining judge times R) appended to information data. The routing information inserters $HI_0$ to $HI_{15}$ each append the destination address and an initial value of the remaining judge times R to information data input thereto from the corresponding one of the input lines $IT_0$ to $IT_{15}$ and the routing information eliminators $HE_0$ to $HE_{15}$ each eliminate these pieces of routing information. The initial value of the judge times information takes n. Letting the number of input lines be represented by N as mentioned previously, $N=2^n$, where n is an integer. In the embodiment depicted in FIG. 2, since $N=16=2^4$, the initial value of the judge times information is $R=n=4$. This judge times information R is usually decremented by one each time it passes through one switching stage together with information data to be transferred.

The address of the routing information eliminator $HE_p$ for which information data is destined is represented by $(d_3, d_2, d_1, d_0)$ in a binary form and given as $p=d_3 \cdot 2^3+d_2 \cdot 2^2+d_1 \cdot 2^1+d_0 \cdot 2^0$; therefore, $0 \leq p \leq N-1=15$. In each switching element $E_{j,i}$ (where $i=0, 1, \ldots, 7$) in the $jth=\{s(n-1)\}$th switching stage $ST_j$ ($s=0, 1$ and $1 \leq k \leq n-1=3$ in the example of FIG. 3), if the judge times information (the remaining judge times R) appended to information data is equal to or greater than 2, the information data is provided to an upper solid-line output terminal 2i or the lower solid-line output terminal $2i+1$ connected to a substitute link depending on whether the value of a bit $d_{4-k}$ of the destination address is 0 or 1. When the remaining judge times R is 1, the information data is provided to an upper broken-lined output terminal 2i connected to an equivalent link or a lower broken-lined output terminal $2i+1$ depending whether the value of a bit $d_0$ of the destination address is 0 or 1. In the following description each bit of the binary-represented address $(d_3, d_2, d_1, d_0)$ will be referred to as a judge bit D.

When no link contention occurs between two pieces of information data which are input into the switching element $E_{j,i}$ from both solid-lined input terminals (or links $L_{j,2i}{}^0$ and $L_{j,2i+1}{}^0$), remaining judge times R appended to each information data is decremented by one and if the decremented remaining judge times R is 0, then the information data appended with the decremented remaining judge times R is output from the switching element $E_{j,i}$ to the broken-lined output terminal 2i or $2i+1$ in accordance with the judge bit D as described above. If the decremented remaining judge times R is greater than 0 (that is, when $R \geq 1$), then the information data is provided to the solid-lined output terminal 2i or $2i+1$ in accordance with the judge bit D. When the remaining judge times R goes to 0 as a result of the decrement in the switching element $E_{j,i}$ of the jth switching stage $ST_j$, it means that the information data has been judged for routing at least n times by at least n (where n=4 in this case) switching elements including the switching element $E_{j,i}$; therefore, it is in the fourth switching stage $ST_4$ or subsequent one of the switching stages that the remaining judge times R can be decremented to 0.

When a link contention occurs, it is decided which information data wins (as described later) and the information data decided to win is controlled using the same algorithm as mentioned above. As for the information data decided to lose, the remaining judge times R is reset to the initial value n=4 and the information data is provided to the solid-lined output terminal 2i or 2i+1 on the basis of an inverted logic $\bar{D}$ of the judge bit D. When information data reaches a switching element having an output terminal at the same position p in the fourth or subsequent one of the switching stages as the position of its appointed routing information eliminator $HE_p$, the information data will thereafter be provided to the specified routing information eliminator $HE_p$ via equivalent links (the horizontally extending links indicated by the broken lines, as referred to previously). The routing operation by a switching stage after resetting of the judge times R to the initial value in the case of a link contention will be referred to also as re-routing.

The above will be described in detail with reference to a concrete example.

Figure 3:
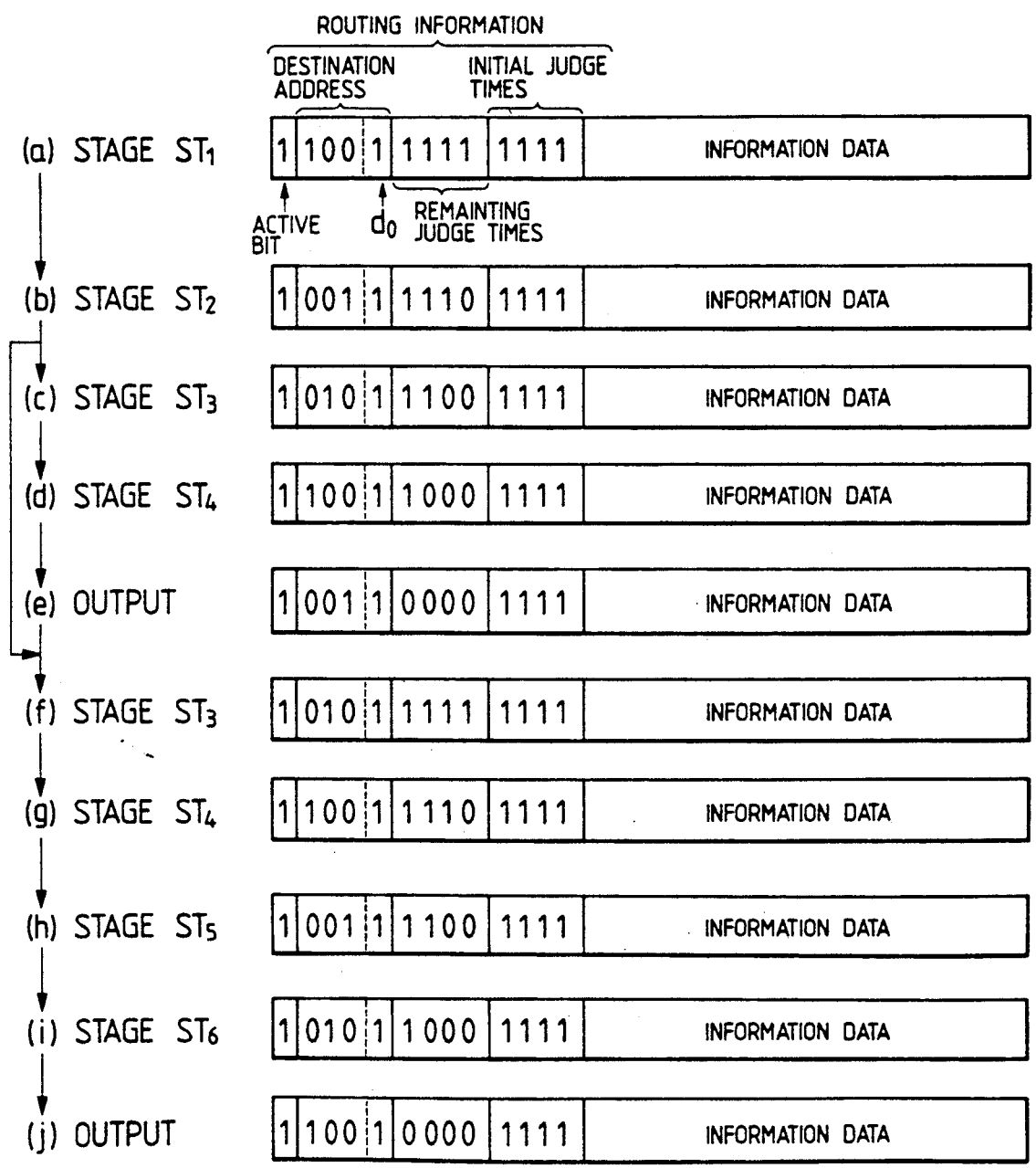
FIG. 3 is a diagram for explaining variations of routing information in each switching stage.

Now, consider the case of routing from the routing information inserter $HI_0$ to the routing information eliminator $HE_9$. In FIG. 2 thick solid lines and thick broken lines show routing paths in the case of no link contention, and double solid lines show routing paths in the case where a link contention occurs. In FIG. 3, steps (a) to (j) show variations of routing information in each switching stage in the both cases. The routing operation will hereinafter be described with reference to steps (a) to (j) in FIG. 3.

In the routing information inserter $HI_0$, as depicted in step (a), information data to be transferred is appended with a destination address (1001) representing in a binary form the address 9 (the position p=9) of the specified routing information eliminator $HE_9$, the remaining judge times R (of the initial value R=4) and the initial judge times value (which is the initial value of the judge times R and the same as n=4, in this instance). The information data thus appended with routing information is input into the switching network. The initial judge times value is provided for resetting the remaining judge times R to the initial value and this need not always be attached to the information data but may also be held in each switching element.

The value of the remaining judge times R is represented by the number of "1s" so as to facilitate the decrement and comparison in each switching element $E_{j,i}$. Of course, the number R may also be decremented in a binary form. In the switching element $E_{1,0}$ into which the information data has input from the routing information inserter $HI_0$ via the link $L_{1,0}^0$, since the remaining judge times R is 4 and since the number $j=\{s(n-1)+k\}$ of the switching stage is 1, s=0, k=1, and consequently, the judge bit D in the destination address is $D=d_{n-k}=d_{4-1}=d_3=1$. The judge bit being means outputting of input information data to the lower solid-lined output terminal connected to the substitute link. If no link contention occurs, the remaining judge times R is decremented by 1, and as a result, the remaining judge times R=3 is greater than 1, so that the switching element $E_{1,0}$ provides the information data and the routing information via the substitute link $L_{2,8}^0$ to the switching element $E_{2,4}$ as shown in FIG. 2 and in step (b) of FIG. 3.

In FIG. 3, in order to allow ease in fetching the corresponding judge bit from the destination address in the switching element $E_{i,j}$ of each switching stage $ST_j$, a bit string ($d_3$, $d_2$, $d_1$) of the address except for the bit $d_0$ is shifted left one bit position so that, in the case of $R \geq 1$, the corresponding judge bit assumes the position of the leading bit of the routing information attached to the information data input into the switching element of each switching stage $ST_j$. That is, in each switching element $E_{j,i}$ a string of the destination address bits, except $d_0$, is circularly shifted one bit to the left, after which the information data input into the switching element $E_{j,i}$ is sent out therefrom to the next subsequent switching element. In the switching element $E_{2,4}$, since the remaining judge times R is 3 and since the number of the switching stage, $j=\{s(n-1)+k\}$, is 2, s=0 and k=2, and consequently, the judge bit D in this case is $D=d_{4-k}=d_2=0$. The judge bit being "0" means outputting of input information data to the upper substitute link. Then, if no contention occurs, the switching element $E_{2,4}$ decrements the remaining judge times R by one to 2 and sends it via the substitute link $L_{3,8}^0$ to the next subsequent switching element $E_{3,4}$ together with the information data as shown in FIG. 2 and in step (c) of FIG. 3. In the switching element $E_{3,4}$, since the remaining judge times R is 2 and since the number of the switching stage, $j=\{s(n-1)+k\}$, is 3, s=0 and k=3, and consequently, the judge bit D in this instance is $d_{4-k}=d_1=0$. The judge bit being "0" means outputting of input information data to the upper substitute links. Then, if no link contention occurs, the switching element $E_{3,4}$ decrements the remaining judge times R by one to 1 and provides it via the substitute link $L_{4,8}^0$ to the next subsequent switching element $E_{4,4}$ together with the information data as depicted in FIG. 2 and in step (d) of FIG. 3. In the switching element $E_{4,4}$, the judge bit D is $d_0=1$ because the remaining judge times R is 1. The judge bit being "1" means that outputting input information data to the lower equivalent link. Then, if no link contention occurs, the switching element $E_{4,4}$ decrements the remaining judge times R by one to zero and provides it via the equivalent link $L_{5,9}^1$ to the next subsequent switching element $E_{5,4}$ together with the information data as depicted in FIG. 2 and in step (e) of FIG. 3. Thereafter, the information data is provided to the routing information eliminator $HE_9$ via the equivalent links $L_{6,9}^1$, $L_{7,9}^1$ and $L_{8,9}^1$.

Let it be assumed, for example, that in the switching element $E_{2,4}$ the information data input thereinto via the substitute link $L_{2,8}^0$ has lost in a link contention with information data input via the substitute link $L_{2,9}^0$. The switching element $E_{2,4}$ uses the initial judge times value n=4 to reset the remaining judge times R to the initial value n=4 and provides it via the substitute link $L_{3,12}^0$ to the switching element $E_{3,6}$ together with the information data in accordance with an inverted logic $\bar{d}_2$ of the judge bit $D=d_2=0$ as shown in FIG. 2 and in step (f) of FIG. 3. In the switching element $E_{3,6}$, since the remaining judge times R is 4 and since the number of the switching stage $ST_j$, $j=\{s(n-1)+k$, is 3, s=0 and k=3, and consequently, the judge bit D in this case is $d_{4-k}=d_1=0$, which means outputting of input information data to the upper substitute link. Then, if no link contention occurs, the switching element $E_{3,6}$ decrements the remaining judge times R by one, and a result of this, the remaining judge times R goes to 3 and is provided via the substitute link $L_{4,12}{}^0$ to the switching element $E_{4,6}$ together with the information data as depicted in FIG. 2 and in step (g) of FIG. 3. In the switching element $E_{4,6}$, since the remaining judge times R is 3 and since the number of the switching stage $ST_j$, $j=\{s(n-1)+k\}$, is 4, s=1 and k=1. Consequently, the judge bit D to be used in this switching element is $d_{4-k}=d_3=1$, which means outputting of the input information data to the lower substitute link. If no link contention occurs, the switching element $E_{4,6}$ decrements the remaining judge times R by one, and as a result of this, the remaining judge times R goes to 2 and is provided via the substitute link $L_{5,13}{}^0$ to the switching element $E_{5,6}$ together with the information data as shown in FIG. 2 and in step (h) of FIG. 3. In the switching element $E_{5,6}$, since the remaining judge times r is 2 and since the number of the switching stage $ST_j$, $j=\{s(n-1)+k\}$, is 5, s=1 and k=2. Consequently, the judge bit D in this case is $d_{n-k}=d_{4-2}=d_2=0$, which means outputting of the input information data to the upper substitute link. If no link contention occurs, the switching element $E_{5,6}$ decrements the remaining judge times R by one, and as a result of this, the remaining judge times R goes to 1 and is provided via the upper substitute link $L_{6,9}{}^0$ the switching element $E_{6,4}$ together with the information data as shown in FIG. 2 and in step (i) of FIG. 3. In the switching element $E_{4,6}$, since the remaining judge times R is 1, the judge bit D in this case is $d_0$32 1, which means outputting of the input information data to the lower equivalent link. If no link contention occurs, the switching element $E_{6,4}$ decrements the remaining judge times R by one. As a result, the remaining judge times R goes to 0 and is provided via the lower equivalent link $L_{7,9}{}^1$ to the switching element $E_{7,4}$ together with the information data as depicted in FIG. 2 and in step (j) of FIG. 3. Thereafter the information data and the routing information are provided via the equivalent link $L_{8,9}{}^1$ routing information eliminator $HE_9$.

Next, it will be verified that any specified output position can be reached using the above-described routing algorithm in the self-routing switch of the present invention which has N×N (where $N=2^n$, n being an integer equal to or greater than 2) input/output lines and $m(n-1)+e$ (where m is an integer equal to or greater than 1 and e is an integer in the range of $1 \leq e \leq n-1$.

VERIFICATION

The verification needs only to show that even if a link contention occurs in a certain switching stage, information data can be transferred to an appointed output position $p=(d_{n-1}, d_{n-2}, \ldots, d_1, d_0)$ by effecting the link selection n times in the subsequent switching stages.

Assume that since in the $(j-1)=\{s(n-1)+k-1\}$th switching stage $ST_{j-1}$ ($s=0, 1, \ldots, m-1, 1\leq k \leq n-1$) a desired link was not available for the input information data due to a link contention, re-routing was started at the $j=\{s(n-1)+\}k$th switching stage $ST_j$, and thereafter desired links were successfully selected in the subsequent switching stages to the $\{j+(n-1)\}=\{(s+1)(n-1)+k\}$th one in spite of link contentions therein. Letting the row position i of the switching element $E_{j,i}$ supplied with information data in the jth switching stage $ST_j$ be represented by a binary number of n−1 bits, $i=(p_{n-1}, p_{n-2}, \ldots, p_1)$, the line positions p of the upper and lower output terminals of the switching element $E_{j,i}$, which are connected to the substitute links, are $p=2i+0$ and $p=2i+1$, respectively, and consequently, they can be expressed by a 2-bit binary number $p=(p_{n-1}, p_{n-2}, \ldots, p_1, d_{n-k})$. Here, $d_{n-k}$ is a judge bit corresponding to the $j=\{s(n-1)+k\}$th switching stage $ST_j$, and the information data in this switching stage is provided to the upper or lower output terminal depending on whether the judge bit $d_{n-k}$ is 0 or 1.

The remaining judge times R of the information data input into the switching element $E_{j,i}$ of the jth switching stage $ST_j$ has been reset to the initial value, and hence is R=n, and the judge bit is $D=d_{n-k}$. Consequently, in the jth switching stage $ST_j$, the information data is provided to the output terminal at the line position $p=(p_{n-1}, p_{n-2}, \ldots, p_1, d_{n-k})^0$. Based on the aforedescribed interstage linking algorithm, the link between the jth and (j+1)th switching stages $ST_j$ and $ST_{j+1}$ transfers the information data to an input terminal at the line position $p=(p_{n-1}, \ldots, p_{n-k+1}, d_{n-k}, p_{n-k-1}, \ldots, p_1, p_{n-k})$ in the (j+1)th switching stage $ST_j$. In the $(j+1)=\{s(n-1)+k+1\}$th switching stage $ST_{j+1}$ the remaining judge times is R=(n−1) and the judge bit is $D=d_{n-k-1}$. Consequently, the information data is transferred via the inter-stage link from an output terminal at the line position $p=(p_{n-1}, p_{n-2}, \ldots, p_{n-k+1}, d_{n-k}, p_{n-k-1}, \ldots, p_1, d_{n-k-1})^0$ in the (j+1)th switching stage $ST_{j+1}$ to an input terminal at the line position $p=(p_{n-1}, \ldots, p_{n-k+1}, d_{n-k}, d_{n-k-1}, \ldots, p_1, p_{n-k-1})^0$ in the (j+2)th switching stage $ST_{j+2}$.

Similarly, in the $(j+n-1-k)=\{s(n-1)+n-1\}$th switching stage the remaining judge times is $R=1+k\geq 2$ and the judge bit is $D=d_{n-(n-1)}=d_1$, so that the information data is transferred to an input terminal at the line position $p=(p_{n-1}, \ldots, p_{n-k+1}, d_{n-k}, d_{n-k-1}, \ldots d_1, p_1)^0$ in the next switching stage. In the $(j+n-k)=\{(s+1)(n-1)+1\}$th switching stage the remaining judge times is R=k and the judge bit is $D=d_{n-1}$, so that the information data is transferred to an input terminal at the line position $p=(d_{n-1}, p_{n-2}, \ldots p_{n-k+1}, d_{n-k}, d_{n-k-1}, \ldots, d_1, p_{n-1})^0$ in the next switching stage. In the $(j+n-2)=(s+1)(n-1)+k-1\}$th switching stage the remaining judge times is R=2 and the judge bit is $D=d_{n-k+1}$, so that the information data is transferred to an input terminal at the line position $p=(d_{n-1}, \ldots, d_1, p_{n-k+1})^0$ in the next switching stage. In the $(j+n-1)=\{(s+1)(n-1)+k\}$th switching stage the remaining judge times is R=1 and the judge bit is $D=d_0$, so that the information data is provided to an output terminal at the line position $p=(d_{n-1}, \ldots, d_1, d_0)^0$. Thus, the information reaches the appointed output position. "Verification ends".

Figure 4:
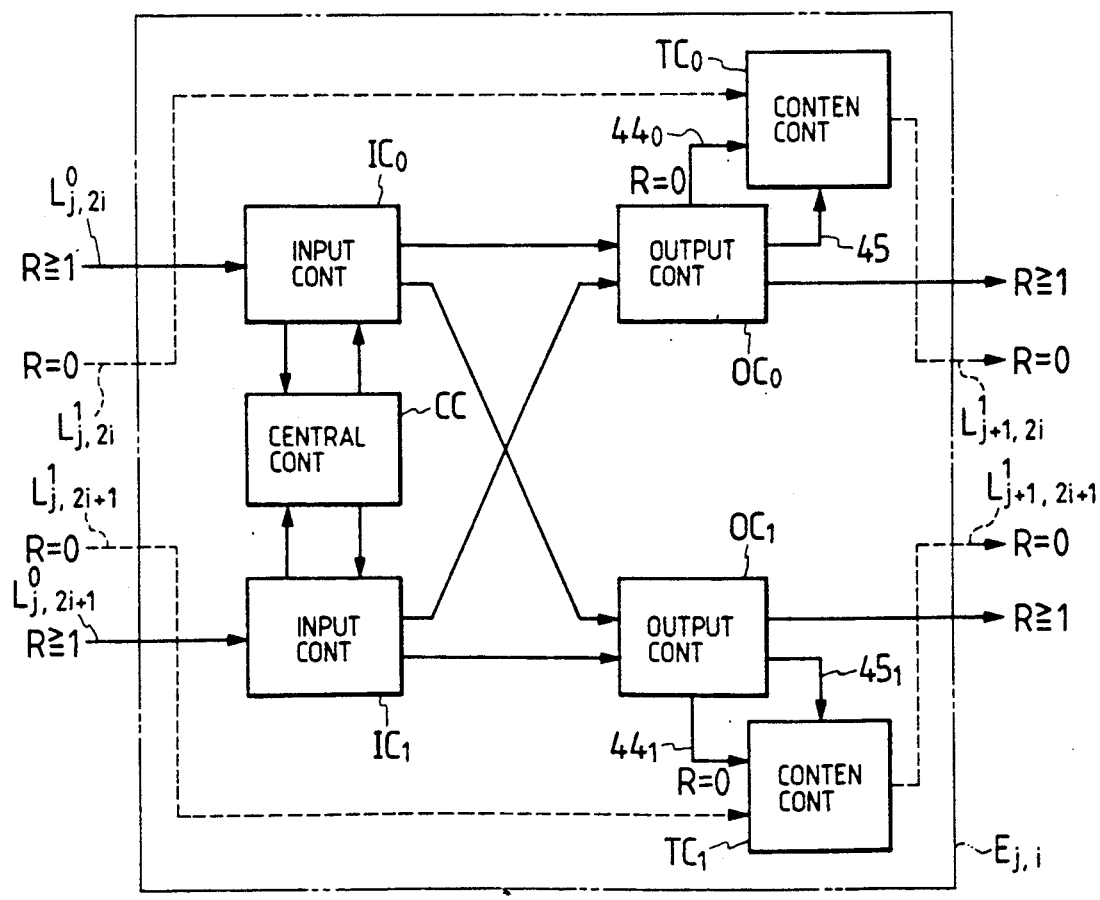
FIG. 4 is a block diagram showing an example of the structure of the switching element $E_{j,i}$.

As shown in FIG. 4, each switching element $E_{j,i}$ in the switching stage $ST_j$ (where $j\geq n$, n being 4 in FIG. 2) comprises input controllers $IC_0$ and $IC_1$ connected to substitute links $L_{j,2i}{}^0$ and $L_{j,2i+1}{}^0$, respectively, output controllers $OC_0$ and $OC_1$ each connected to both of the input controllers $IC_0$ and $IC_1$, a central controller CC connected to the input controllers $IC_0$ and $IC_1$, a contention controller $TC_0$ connected to an equivalent link $L_{j,2i}{}^1$ and the output controller $OC_0$, and another contention controller $TC_1$ connected to an equivalent link $L_{j,2i}{}^1$ and the output controller $OC_1$. Incidentally, each switching element in the switching stage $ST_j$ (where $1 \leq j \leq n-1$) is identical in construction with the above-mentioned switch element except that the contention controllers $TC_0$ and $TC_1$ and the associated connections in FIG. 4 are removed, and each switching element in the nth switching stage is identical in construction with the switching element in FIG. 4 except that the equivalent links $L_{j,2i}^1$ and $L_{j,2i+1}^1$ on the input side are open-circuited or removed.

Figure 5A:
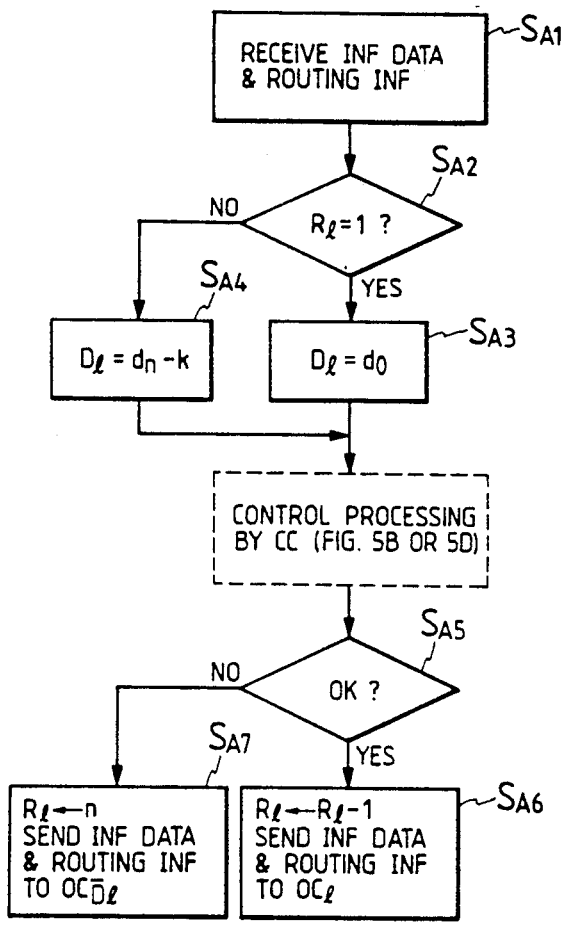
FIG. 5A is a flowchart showing a control procedure in an input controller IC in the switching element $E_{j,i}$.
Figure 5B:
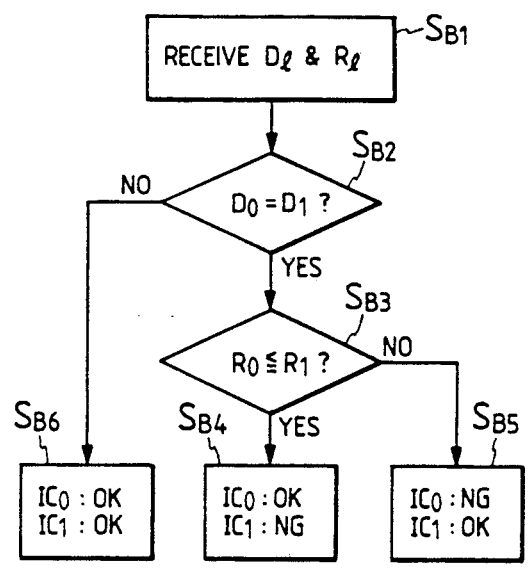
FIG. 5B is a flowchart showing a control procedure in a central controller CC in the switching element $E_{j,i}$.
Figure 5C:
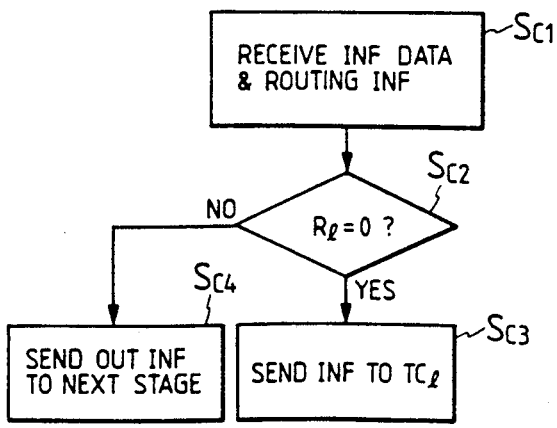
FIG. 5C is a flowchart showing a control procedure in an output controller OC in the switching element $E_{j,i}$.
Figure 5D:
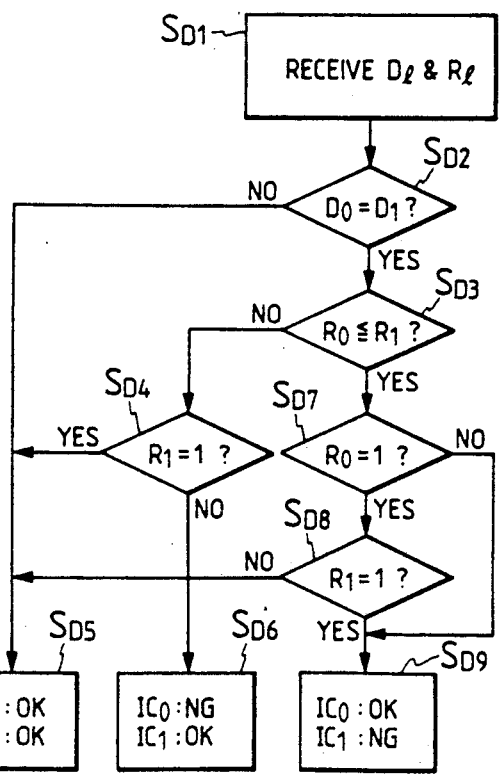
FIG. 5D is a flowchart showing another example of the control procedure in the central controller CC.

FIG. 5A is a flowchart showing a control procedure of the input controller $IC_l$ (where l is 0 or 1, indicating generally either of the input controllers $IC_0$ and $IC_1$), FIG. 5B a flowchart showing a control procedure I of the central controller CC, FIG. 5C a flowchart showing a control procedure of the output controller $OC_l$, and FIG. 5D a flowchart showing an alternative control procedure II of the central controller CC.

Reference is made to FIGS. 4 and 5A. In the following description values of the remaining judge times in the routing information of information data input via the substitute links $L_{j,2i}^0$ and $L_{j,2i+1}^0$ will be represented by $R_0$ and $R_1$, respectively, which will be identified by $R_l$ (where l is 0 or 1). Similarly, the judge bits D of the destination addresses in the routing information of information data input via the links $L_{j,2i}^0$ and $L_{j,2i+1}^0$ will be represented by $D_0$ and $D_1$, respectively, which will be identified by $D_l$ (where l is 0 or 1). In step $S_{A1}$ the input controllers $IC_0$ and $IC_1$ receive via the substitute links $L_{j,2i}^0$ and $L_{j,2i+1}^0$ information data and routing information attached thereto. In step $S_{A2}$ it is determined whether the value of remaining judge times $R_l$ is 1 or not. If it is 1, then it is decided in step $S_{A3}$ that the judge bit $D_l$ is at the bit position $d_0$, and if it is found in step $S_{A2}$ that the remaining judge times value $R_l$ is not 1, then it is decided in step $S_{A4}$ that the judge bit $D_l$ is at the bit position $d_{n-k}$, and the result of this decision is provided to the central controller CC. Then the operation proceeds to the control process in the central controller CC, shown in FIG. 5B.

FIG. 5B shows in detail the control process in the central controller CC. In step $S_{B1}$ the central controller CC receives from the input controllers $IC_l$ the judge bits $D_l$ and the remaining judge times values judge times values are provided to the central controller CC is that when an output link contention occurs between the information data received by the input controllers $IC_0$ and $IC_1$, the values of remaining judge times are used to decide which information data wins in the contention. In this example the information data of the smaller remaining judge times value $R_l$ is decided to win.

The central controller CC first compares the judge bits $D_0$ and $D_1$ in step $S_{B2}$. If they are equal, this means the occurrence of the output link contention. Then the central controller CC compares the remaining judge times values $R_0$ and $R_1$ in step $S_{B3}$. If the remaining judge times value $R_0$ is smaller than or equal to the other $R_1$, then the central controller CC decides in step $S_{B4}$ that the input controller $IC_0$ wins (OK) and the input controller $IC_1$ loses (NG), and the central controller CC applies an OK signal and an NG signal to the input controllers $IC_0$ and $IC_1$, respectively. When the remaining judge times value $R_0$ is larger than $R_1$, it is decided in step $S_{B5}$ that the input controller $IC_1$ wins (OK) and the input controller $IC_0$ loses (NG), and OK and NG signals are provided to the input controllers $IC_0$ and $IC_1$, respectively.

When it is found in step $S_{B2}$ that the judge bits $D_0$ and $D_1$ are not equal, there is no link contention, and consequently, it is decided in step $S_{B6}$ that the input controllers $IC_0$ and $IC_1$ both win (OK), and OK signals are applied to them. This terminates the control procedure shown in FIG. 5B.

Next, the process returns to the control procedure at each input controller $IC_l$ depicted in FIG. 5A. In the case where the input controller $IC_l$ is supplied with the OK signal in step $S_{A5}$, the process proceeds to step $S_{A6}$, wherein the remaining judge times value $R_l$ is decremented by one to provide the decremented value as the remaining judge times value $R_l$ and the information data is provided to the output controller $OC_l$ specified by the judge bit $D_l$. In the case where the input controller $IC_l$ is supplied with the NG signal, the process proceeds to step $S_{A7}$, wherein the remaining judge times value R is reset to n (the initial value) and the information data is provided to the output controller $OC_l$ which is specified on the basis of inverted logic $\overline{D_l}$ of the judge bit $D_l$. This terminates the control procedure shown in FIG. 5A.

FIG. 5C shows the control process of the output controller $OC_l$. When supplied in step $S_{C1}$ with the information data from the input controller $IC_l$ together with the routing information updated in step $S_{A6}$ or $S_{A7}$ in FIG. 5A, the output controller $OC_l$ determines in step $S_{C2}$ whether the remaining judge times value $R_l$ is 0. If it is 0, then the information data is provided in step $S_{C3}$ to the contention controller $TC_l$ for output to the equivalent link (the broken-lined link). When the remaining judge times value $R_l$ is not 0, the process proceeds to step $S_{C4}$, in which the information data is provided to the next switching stage for further routing. The contention controller $TC_l$ effects control in the case where a contention occurs between the information data input via the equivalent link $L_{j,2i+l}^1$ the information data input from the output controller $OC_l$.

The case in which it is decided in step $S_{B2}$ in the control process of the central controller CC shown in FIG. 5B that $D_0 = D_1$, that is, a link contention occurs, includes also a situation in which the one input information data has a remaining judge times value equal to or greater than 2 and hence is to be provided on the substitute link, whereas the other input information data has a remaining judge times value of 1 and hence is to be provided on the equivalent link. In such a situation the two pieces of information data can be output to the respective links, but the control process depicted in FIG. 5B discontinues routing of either one of the pieces of information data, and consequently, the control process is not desirable in terms of the throughput of the switch.

The control procedure II of the central controller CC shown in FIG. 5D illustrates an example which is free from the above-mentioned defect of the control process shown in FIG. 5B.

In this instance, the judge bits $D_0$ and $D_1$ received from the input controller $IC_l$ in step $S_{D1}$ are compared in step $S_{D2}$. When their values are equal, the remaining judge times values $R_0$ and $R_1$ are compared in step $S_{D3}$. If the value $R_1$ is smaller than $R_0$, then it is determined in step $S_{D4}$ whether the remaining judge times value $R_1$ is 1 or not. If it is 1, then the information data must be such one that is provided from the output controller $OC_1$ via the contention controller $IC_1$ to the equivalent link. Then the process proceeds to step $S_{D5}$, in which OK signals are applied to the input controllers $IC_0$ and $IC_1$. When $R_1$ is not 1 in step $S_{D4}$, a link contention occurs, so that the process proceeds to step $S_{D6}$, wherein an NG signal and an OK signal are provided to the input controller $IC_0$ and the input controller $IC_1$, respectively. If $R_1$ is not smaller than $R_0$ in step $S_{D3}$, then it is determined in step $S_{D7}$ whether $R_0$ is 1 or not. If $R_0$ is 1, this means that the information data appended with $R_0$ should be output to the equivalent link, and it is further determined in step $S_{D8}$ whether $R_1$ is 1 or not. If $R_1$ is not 1, this means that the information data appended with $R_1$ should be provided on the substitute link. Since no link contention occurs, the process proceeds to step $S_{D5}$, in which OK signals are applied to the input controllers $IC_0$ and $IC_1$. When it is found in step $S_{D8}$ that $R_1$ is equal to 1, a link contention occurs, since $R_0$ is also 1. Consequently, an OK and an NG signal are provided to the input controllers $IC_0$ and $IC_1$, respectively, in step $S_{D9}$. Also in the case where it is decided in step $S_{D7}$ that $R_0$ is not 1, the OK and the NG signal are applied to the input controllers $IC_0$ and $IC_1$, respectively, since a link contention occurs.

It is also possible to employ a method in which when the remaining judge times $R_0$ and $R_1$ are equal in step $S_{B3}$ in the control procedure I of the central controller CC shown in FIG. 5B, an OK signal is applied to a predetermined one of the input controllers $IC_0$ and $IC_1$, or it is also possible to randomly select one of them each time. The same is true of the control procedure II of the central controller CC depicted in FIG. 5D.

A link contention, which occurs in the contention controller $TC_0$ between two pieces of information data simultaneously input into the same switching element when their remaining judge times $R_0$ and $R_1$ and their judge bits $D_0$ and $D_1$ are respectively equal, that is, when $R_0=R_1=1$ and $D_0=D_1$, can be avoided, for example, by providing a buffer (not shown) in the output controller $OC_l$ so that the two pieces of information data are output at different timing, as described hereinbelow.

Incidentally, control of a contention for the same output equivalent link can be achieved by a method in which information data having lost the contention is caused to wait in a buffer provided at the input side of the first switching stage $ST_1$, for example, in the routing information inserter, and a method in which the information data is caused to wait in a buffer provided in the contention controller of the switching element in which the contention occurred. In the former routing of the information data having waited is started by applying an acknowledge signal to the routing information inserter, whereas in the latter transfer control is effected between contention controllers. This control can be achieved by using such a known technique as utilized in a bus access control, but the following will describe the case where the buffer in the latter method is provided in the contention controller TC.

Figure 6A:
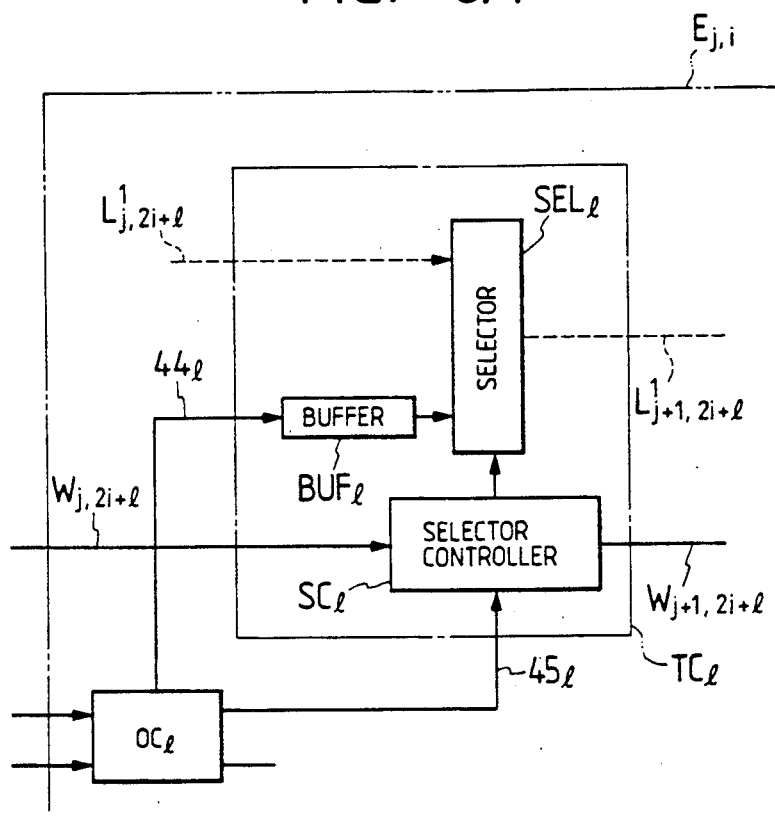
FIG. 6A is a block diagram illustrating an example of the structure of a contention controller TC in the switching element $E_{j,i}$.
Figure 6B:
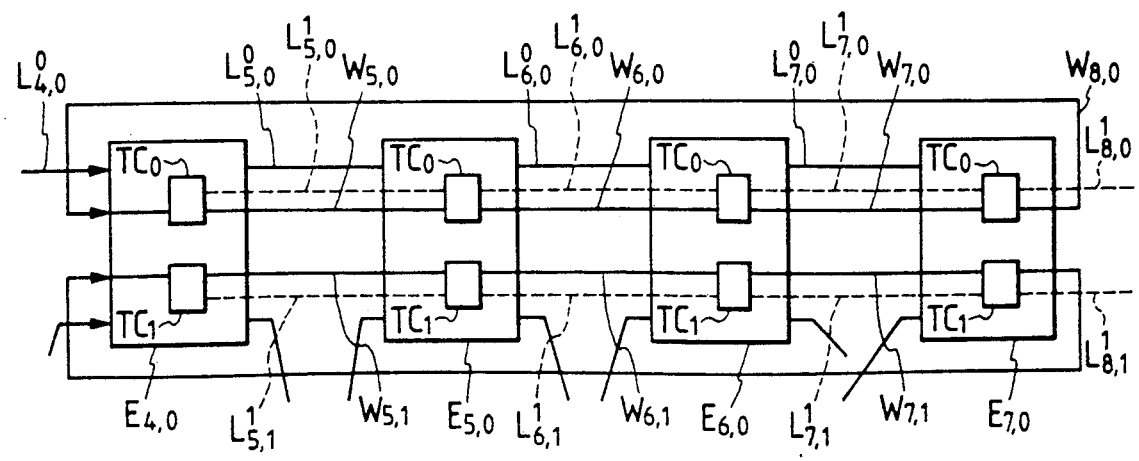
FIG. 6B is a diagram for explaining the connection of the contention controller TC of each switching stage.
Figure 6C:
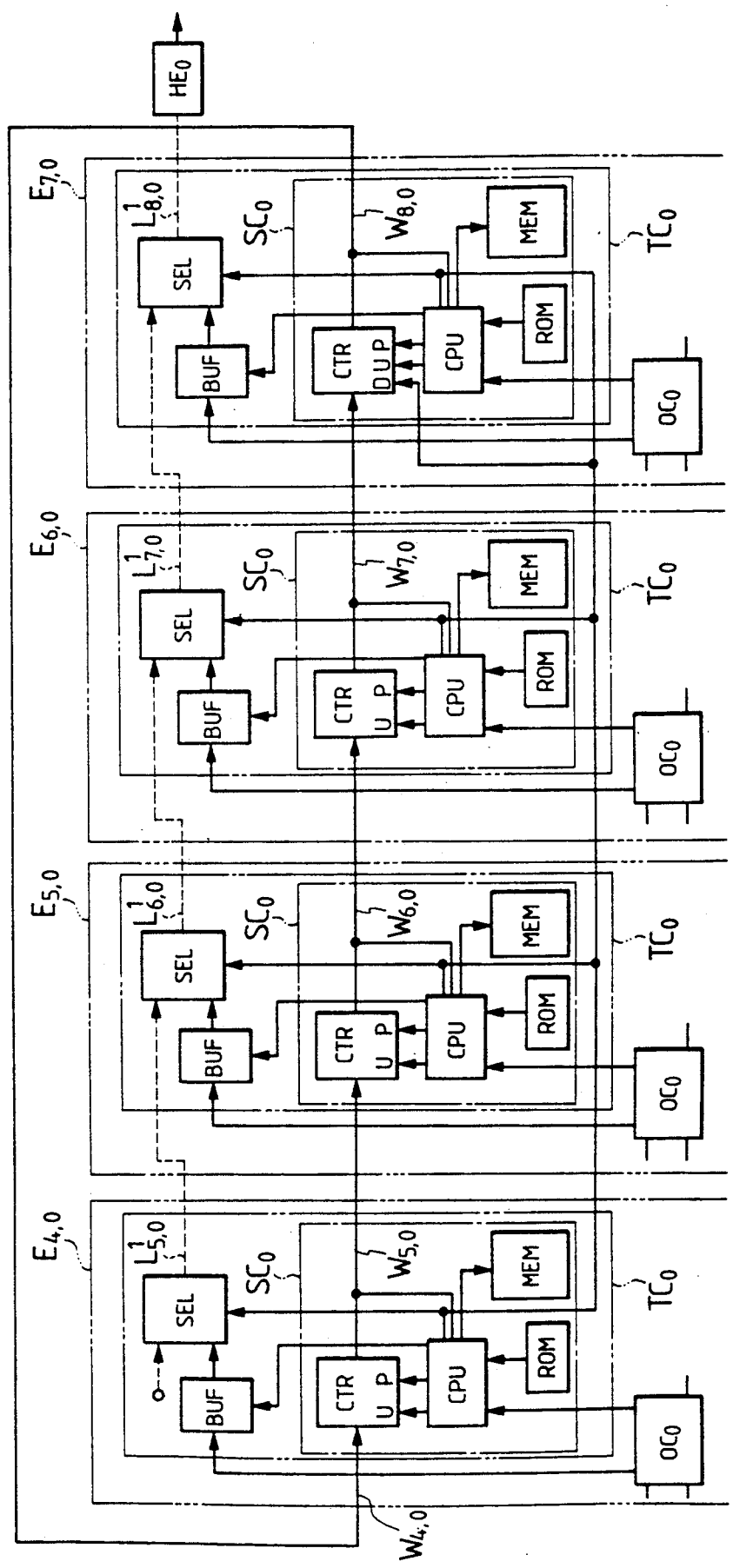
FIG. 6C is a diagram showing an example of the structure of a selector controller SC in the contention controller TC of each stage and explanatory of the connection of such selector controllers SC.

FIG. 6A illustrates in block form a specific operative example of the contention controller $TC_l$ (where l=1, 0) provided with a buffer in the switching element $E_{j,i}$ depicted in FIG. 4. As shown, the contention controller $TC_l$ in the jth switching stage $ST_j$ (where $j \geq n$) comprises a selector $SEL_l$ which selects either one of the equivalent link $L_{j,2i+l}^1$ fom the (j−1)th switching stage $ST_{j-1}$ and an input line $44_l$ from the output controller $OC_l$ in the switching element $E_{j,i}$ to which the contention controller $TC_l$ belongs; a selector controller $SC_l$ for controlling the selection procedure of the selector $SEL_l$; and a buffer $BUF_l$ for temporarily storing information data which is provided via the input line $44_l$ to the selector $SEL_l$. The selector controller $SC_l$ in each switching element $E_{j,i}$ in the jth switching stage $ST_j$ is connected via a control line $W_{j+1,2i+1}$ to the selector controller $SC_l$ in the switching element $E_{j+1,i}$ at the same row position i in the (j+1)th switching stage $ST_{j+1}$. Accordingly, a control line $W_{j,p}$ is provided along each equivalent link $L_{j,p}^1$ (where $n=4 \leq j \leq 7$ and $0 \leq p \leq 15$). FIG. 6B shows, for the sake of brevity, only the connections of the contention controllers $TC_l$ in the switching elements $E_{4,0}$, $E_{5,0}$, $E_{6,0}$ and $E_{7,0}$. FIG. 6C shows in detail respective selector controllers $SC_l$ in the contention controllers $TC_l$ each depicted in FIG. 6A and their connections on the l=0 side.

Each selector controller $SC_0$ comprises, as shown in FIG. 6C, a presettable counter $CTR_0$ for creating sequence number M, a memory $MEM_0$ for storing the sequence number M, a read only memory $ROM_0$ having stored therein the control procedure of the selector controller $SC_0$, and a central processing unit $CPU_0$ for controlling the counter $CTR_0$, the memory $MEM_0$, the buffer $BUF_0$, the selector $SEL_0$, etc. in accordance with the control procedure. The counter $CTR_0$ in the switching element $E_{7,0}$ of the last switching stage $ST_7$ is a presettable reversible counter. The counters $CTR_0$ in the switching elements $E_{4,0}$ to $E_{7,0}$ of the switching stages $ST_4$ to $ST_7$ are circularly interconnected and their contents can be shifted circularly. The selector SEL in each switching stage $ST_j$ (where $7 \geq j \geq 4$) normally connects the input equivalent link $L_{j,o}^1$ to the output equivalent link $L_{j+1,0}^1$, and when having judged that an information data cell should be provided to the equivalent link $L_{j+1,0}^1$ from the buffer BUF, the CPU in any switching element $E_{j,0}$ applies a control signal to the selector SEL, connecting the buffer BUF to the equivalent link $L_{j+1,0}^1$. As will be described later, two or more selectors SEL will not simultaneously be connected to the buffer BUF side in the switching elements $E_{4,0}$ to $E_{7,0}$.

Figure 7:
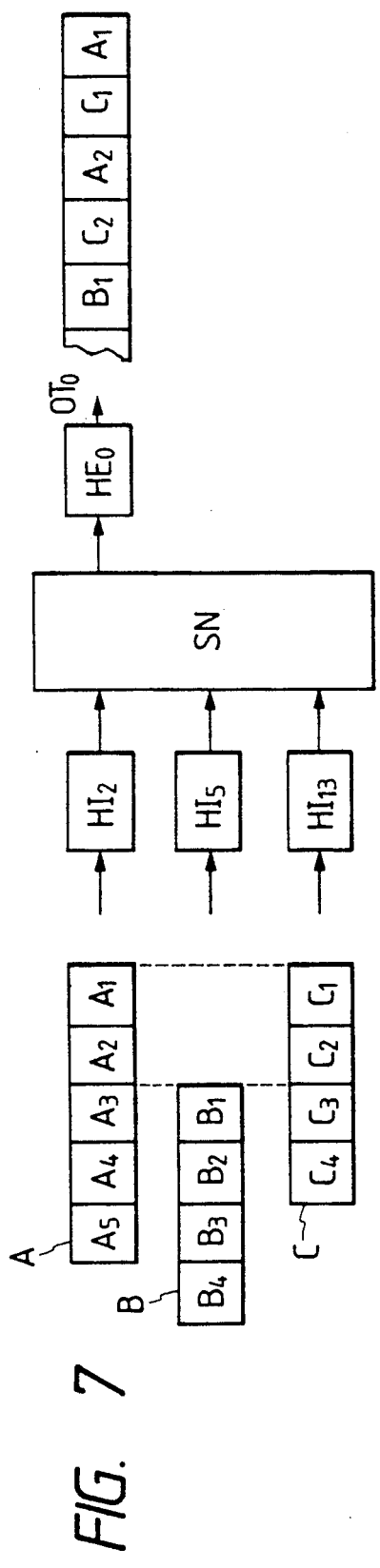
FIG. 7 is a diagram for explaining information data A, B and C which are destined for the same output line and input into a self-routing switch SN from different input lines.
Figure 8:
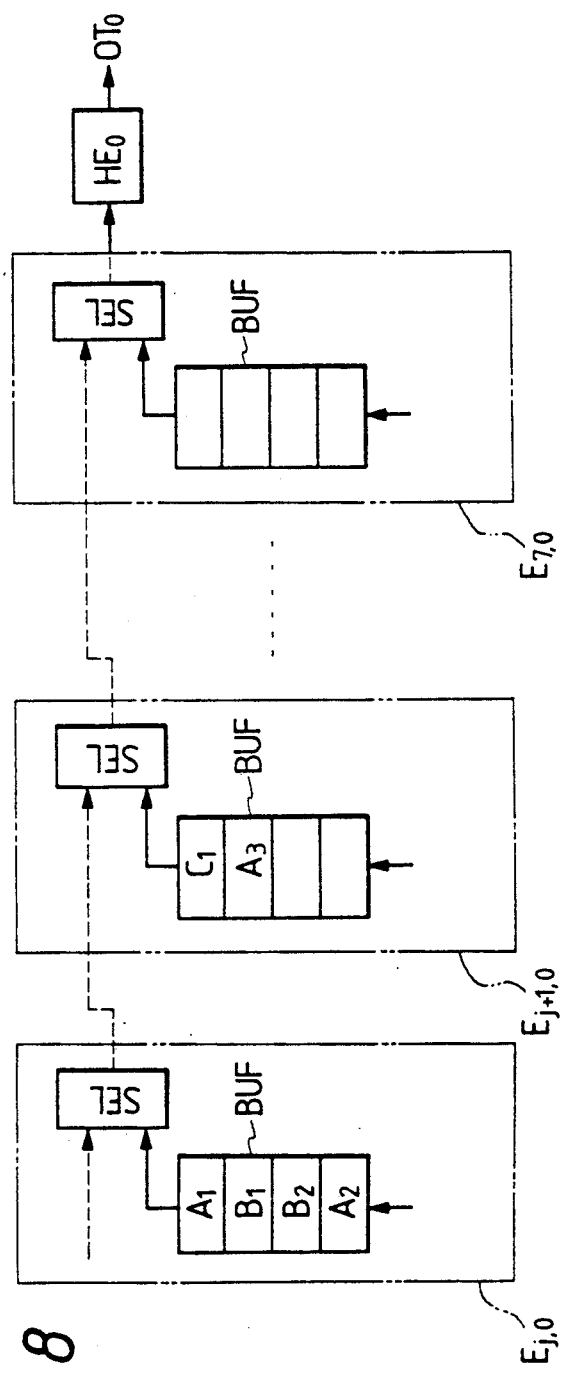
FIG. 8 is a diagram for explaining a reversal of the order of output of information data cells input from the same input line in FIG. 7.
Figure 9:
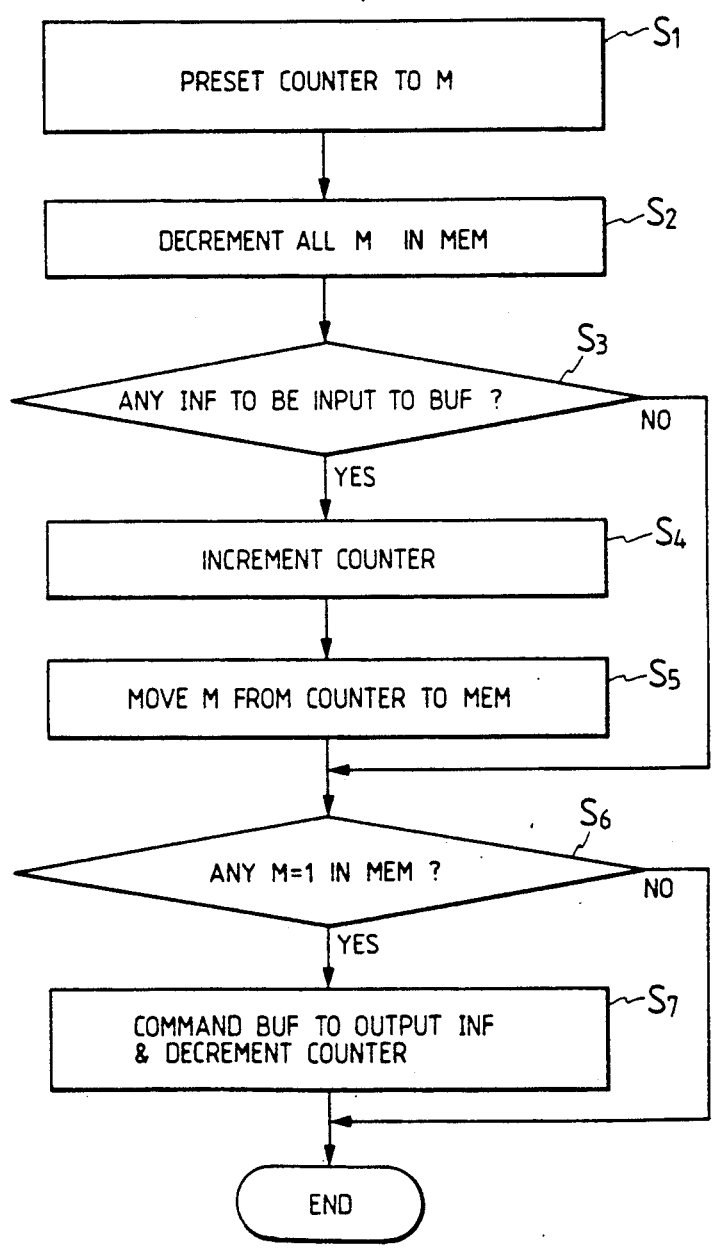
FIG. 9 is a flowchart showing a control procedure of the contention controller TC depicted in FIG. 6C.

Now, a description will be given of the case where pieces of information data A, B and C which are input into different routing information inserters, for example, $HI_2$, $HI_5$ and $HI_{13}$, are output to the same output line, for example, $OT_0$ as shown in FIG. 7. The respective pieces of information data A, B and C are appended with routing information for each cell ($A_1$, $A_2$, ..., $B_1$, $B_2$, ..., and $C_1$, $C_2$, ...) of a predetermined length by the routing information inserters $HI_2$, $HI_5$ and $HI_{13}$, and they are successively input into the switching network SN of the present invention on a fixed period. Since the plurality of cells are simultaneously transferred to the same output line $OT_0$, a link contention occurs in the switching network SN. In the switch of the present invention, however, the afore-mentioned link selection is made, by which these cells are stored in the buffers BUF in the different switching stages $ST_4$ to $ST_7$ shown in FIG. 6C and wait until the CPU issues output instructions. Since routing information inserters other than those $HI_2$, $HI_5$ and $HI_{13}$ are also transferring information data cells to other output lines, a sequence of information data cells $A_1$, $A_2$, $A_3$, ... do not always reach the buffer BUF of the same switching element $E_{j,0}$ due to a link contention in the switching network SN. In consequence, a large number of information data cells may sometimes concentrate on the buffer BUF of a certain switching element $E_{j,0}$ as shown in FIG. 8. In such an instance, if the information data cells are read out one by one from each buffer BUF for output to equivalent links, there is the possibility of the cells being provided to the output line $OT_0$ in the order of $A_1$, $C_1$, ..., $B_1$, $A_3$, ..., $B_2$, ..., $A_2$, for example, that is, the cells $A_2$ and $A_3$ of the information data A input from the same input line may be output in a sequence opposite to the input sequence in some cases. The configuration of each contention controller $TC_0$ shown in FIG. 6C controls the readout of the buffer BUF of each switching element $E_{j,0}$ on the basis of the sequence number M so as to prevent such a reversal of the output sequence. Next, this control operation will be described with reference to the flowchart depicted in FIG. 9.

In the switching element $E_{4,0}$ the CPU starts its control operation at step $S_1$ in which it applies to the counter CTR with a control signal for presetting the sequence number M (whose initial value is 0) on the control line $W_{4,0}$, and if sequence numbers have already been stored in the memory MEM, then the CPU decrements all of them by one in step $S_2$. In the case where it is decided in step $S_3$ that the output controller $OC_0$ has an information data cell to be output to the output line $OT_0$, for which routing by the link selection has been completed, the cell is transferred from the output controller $OC_0$ into a CPU's specified area in the buffer BUF of the contention controller $TC_0$, and the CPU increments the counter CTR by one in step $S_4$. The CPU then stores the contents of the counter CTR in an area of the memory MEM corresponding to the above specified area of the buffer BUF in step $S_5$. If there is no information data to be input into the buffer BUF in step $S_3$, the counter CTR will not be incremented. Next, as in the above-mentioned steps $S_1$ to $S_5$, the contents of the CTR of the switching element $E_{4,0}$ are preset in the counter CTR in the switching element $E_{5,0}$ of the next switching stage. Also in this switching element $E_{5,0}$, sequence numbers M stored in the memory MEM are all decremented by one, and when an information data cell is input into a specified area of the buffer BUF, the counter CTR is incremented by one and its contents are stored in the corresponding area of the memory MEM. At the same time, as in steps $S_1$ to $S_5$, the contents of the counter CTR are preset in the counter CTR in the switching element $E_{6,0}$ and the same operation is repeated Also in the switching element $E_{7,0}$ of the final switching stage $ST_7$, the sequence number M from the preceding stage is preset in the counter CTR, each sequence number M in the memory MEM is decremented by one, and if there is an information data cell to be input into the buffer BUF, then the cell is input thereinto and the counter CTR is incremented by one, after which its contents are written into the memory MEM.

Upon completion of the above operation, the CPU in each switching element $E_{j,0}$ (where $4 \leq j \leq 7$) checks in step $S_6$ whether or not a sequence number $M=1$ is included in those stored in the memory MEM. If such a sequence number $M=1$ is included, then in step $S_7$ the CPU applies a control signal to the selector SEL to connect it to the buffer BUF side, and at the same time, the CPU reads out the information data cell from an address position in the buffer BUF corresponding to the address in the memory MEM in which the above-mentioned sequence number $M=1$ is being stored, and provides the information data cell to the equivalent link $L_{j+1,0}^1$ via the selector SEL. The control signal for the selector SEL is also provided to the counter CTR in the switching element $E_{7,0}$ of the final switching stage, decrementing its contents by one. Where the sequence number $M=1$ is not found in the memory MEM in step $S_6$, the selector SEL remains connected to the input equivalent link side. Where the sequence number $M=1$ is present in any one of the memories MEM of the switching elements $E_{4,0}$ to $E_{7,0}$, the information data cell output from the buffer BUF onto the equivalent link via the selector SEL is provided intact to the routing information eliminator $HE_0$, for there is no sequence number $M=1$ in the other memories MEM. The above operation terminates one cycle of transfer of the information data cell to the routing information eliminator $HE_0$. After the transfer of this cell the CPU in the switching element $E_{4,0}$ of the fourth switching stage $ST_4$ supplies again the counter CTR with the control signal for presetting therein the sequence number M on the control line $W_{4,0}$, that is, the contents of the counter CTR of the final switching stage $ST_7$, and thereafter the same operations as mentioned above are repeated.

Figure 10:
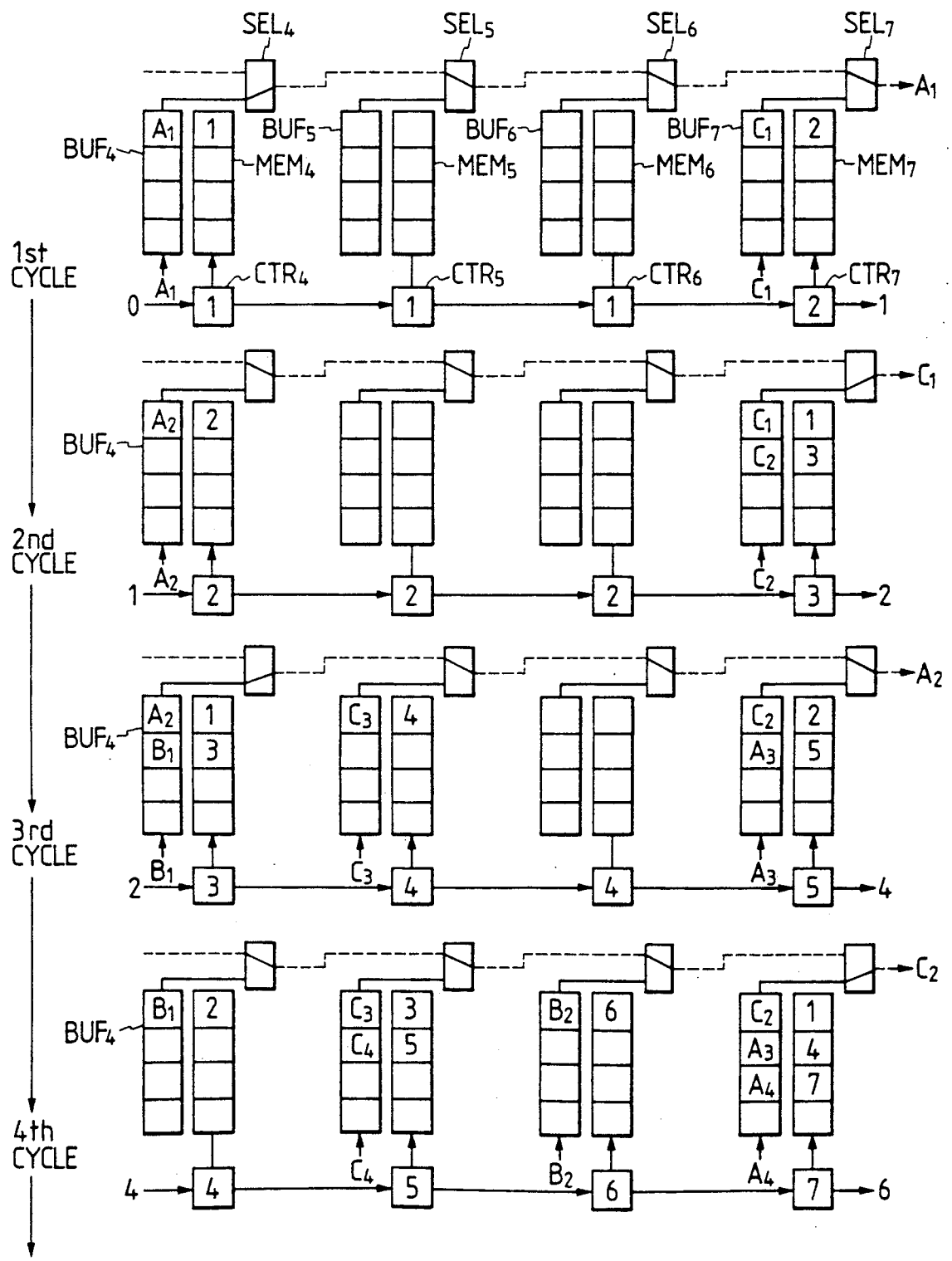
FIG. 10 is a diagram showing variations of the relationship between the input of an information data cell and the corresponding order number M in each stage.

FIG. 10 shows, by way of example, variations, with successive cell transfer cycles, of the information data cells which are stored in the buffers BUF and the sequence numbers M which are written into the memories MEM correspondingly in the case where the information data A, B and C shown in FIG. 7 are transferred toward the same output line $OT_0$ in accordance with the above-described output sequence control operation. In FIG. 10 there are shown only the counters CTR, the buffers BUF, the memories MEM and the selectors SEL which are directly associated with the sequence numbers and the information data cells, and their reference characters are respectively suffixed with the stage numbers 4 to 7 to which they belong.

In the first cell transfer cycle, since the initial value 0 is preset in the counter $CTR_4$ of the fourth switching stage $ST_4$ and since the cell $A_1$ is input into the buffer $BUF_4$, the counter $CTR_4$ is incremented by one and its content (the sequence number M) becomes 1. The number "1" is written into an address position in the memory $MEM_4$ corresponding to the cell $A_1$ written into the buffer $BUF_4$.

The counter $CTR_5$ of the fifth switching stage $ST_5$ presets therein the content $M=1$ of the counter $CTR_4$ of the preceding stage, but since no cell is input into the buffer $BUF_5$, the contents of the counter $CTR_5$ are not incremented and no write is effected in the memory $MEM_5$. The sixth switching stage $ST_6$ also performs the same operation as described above. In the seventh switching stage $ST_7$, since the sequence number $M=1$ from the preceding stage is preset in the counter $CTR_7$ and the cell $C_1$ is input into the buffer $BUF_7$, the contents of the counter $CTR_7$ are incremented to $M=2$. This sequence number 2 is written into the memory $MEM_7$ at an address position corresponding to the cell $C_1$ written in the buffer $BUF_7$.

Since the sequence number $M=1$ is stored in the memory $MEM_4$ among those $MEM_4$ to $MEM_7$, the cell $A_1$ in the buffer $BUF_4$ corresponding to the number $M=1$ is output via the selector $SEL_4$ to the equivalent link, by which the counter $CTR_7$ of the final switching stage $ST_7$ is decremented by one. This terminates the first cell transfer cycle.

In the second cell transfer cycle the contents $M=1$ of the counter $CTR_7$ decremented in the previous cycle are preset in the counter $CTR_4$ of the fourth switching stage $ST_4$. Since the cell $A_1$ in the buffer $BUF_4$ was already read out in the previous cycle and since the corresponding number $M=1$ in the memory $MEM_4$ was also erased, the memory $MEM_4$ has no sequence number M to be decremented in the current cycle. The cell $A_2$ is input into the buffer $BUF_4$, the contents of the counter $CTR_4$ are incremented by one to 2, and the sequence number M=2 is written into the memory MEM₄.

In the fifth and sixth switching stages ST₅ and ST₆, since no cell is input into the buffers BUF₅ and BUF₆, the counters CTR₅ and CTR₆ only preset therein the sequence number M=2 from their preceding stages, respectively.

In the seventh switching stage ST₇ the cell C₁ in the previous cycle remains in the buffer BUF₇ and the corresponding sequence number M=2 also remains in the memory MEM₇ The remaining sequence number M in the memory MEM₇ is decremented by one causing M=1 and the contents M=2 of the counter CTR₆ of the preceding stage is preset in the counter CTR . Since the cell C2 is input into the buffer BUF₇, the contents of the counter CTR₇ are incremented by one and its value M=3 is written into the memory MEM₇

Since the sequence number M=1 is being stored in the memory MEM₇ among those MEM₄ to MEM₇, the cell C₁ corresponding to this number M=1 is output from the buffer BUF₇ via the selector SEL₇, and at the same time, the contents of the counter CTR₇ are decremented by one to M=2. This terminates the second cell transfer cycle.

Also in the subsequent cell transfer cycles similar operations are performed, but no description will be given, for their contents are evident from the above description and the examples of the third and subsequent cell transfer cycles shown in FIG. 10. Further, as will be seen from FIG. 10, in each cell transfer cycle a continuance of sequence numbers M are written into the memories MEM₄ to MEM₇ corresponding to the information data cells which are written into the buffers BUF to BUF₇ In addition, even if the cell transfer cycle advances, the continuity of the sequence numbers M which are stored in the memories MEM₄ to MEM₇ is retained, and consequently, the information data cells are read out 25 of the buffers BUF₄ to BUF₇ in the sequence in which they were written thereinto, and the cells are provided to the routing information eliminator HE₀ Thus, there is no possibility of a reversal of the output sequence of some of a series of information data cells which are input into the switching network from a certain input line toward a certain output lines.

While in the embodiment of FIG. 2 the switching element $E_{j,i}$ in the switching stage preceding the stage (n−1) does not include the equivalent link $L_{j,2i+l}{}^1$, the control line $W_{j,2i+l}$ and the contention controller $TC_l$ shown in FIG. 4, the above-mentioned structure can be employed as it is.

Various methods can be considered for handling information data which could not reach the intended output line position until the final switching stage. There are, for example, a method in which information data output to a substitute link (though not shown in FIG. 2) of the final switching stage is returned to the routing information inserter $H_p$ I at the same line position p, wherein the remaining judge times value is reset and the information data is re-input into the switching network; a method in which a redundancy switching stages are provided succeeding the final switching stages and in these stages routing control is effected so that even if a link contention occurs, information data is not provided to an other link than originally intended one but is buffered for later output to the originally intended link (because in the redundant stages after the final switching stage the link utilization factor is so low that the throughput is not appreciably reduced); and a method in which only routing information is input from a routing information inserter to the switching network prior to the input of information data contrary to such methods as referred to previously, an acknowledge signal is returned to the routing information inserter from the intended output position which the routing information has reached, the information data for which the acknowledge signal has been received is transferred to the above output position, and information data which no acknowledge signal has been received is re-input to the switching network at the next occasion.

Moreover, there are also various methods which can be utilized for meeting the situation in which the buffer of the switching element is full, such as a method in which the remaining judge times value of information data is reset and the information data is output on the substitute link for starting its re-routing at the next stage.

The embodiment depicted in FIGS. 6A to 6C is adapted so that a reversal of the output sequence of cells is prevented by causing the sequence numbers to correspond to the information data cells which are input into the buffers BUF in the switching elements $E_{4,i}$ to $E_{7,i}$. For maintaining the output sequence it is also possible to employ a structure in which in the routing information inserter $HI_p$ the sequence numbers are appended to a sequence of respective information data cells destined for the same output line and in the routing information eliminator $HE_p$ the information data cells are rearranged correctly in accordance with the sequence numbers before they are output.

Figure 11:
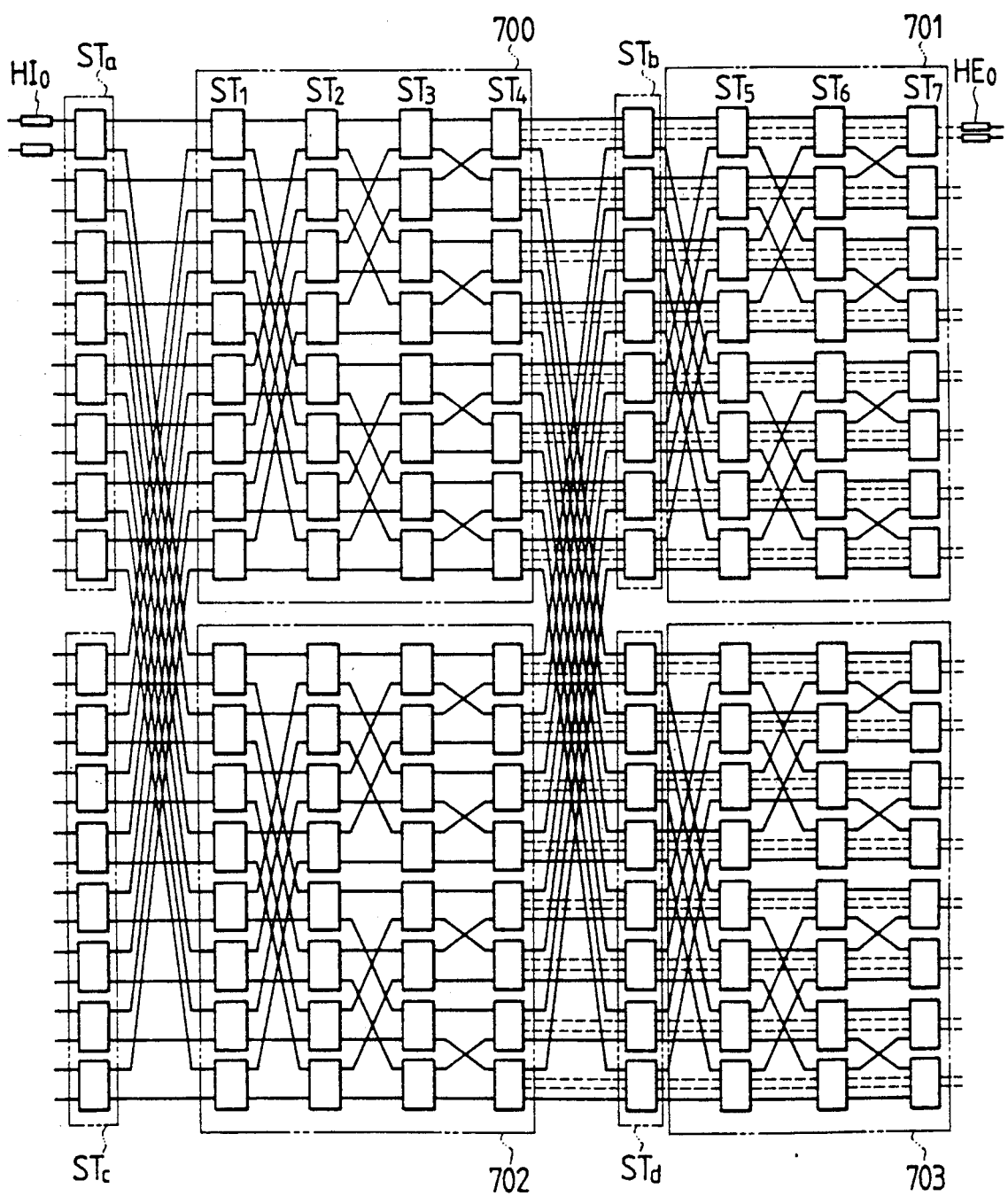
FIG. 11 is a block diagram explanatory of an extension of the self-routing switch depicted in FIG. 2.

FIG. 11 is a block diagram showing a method for extending the switching network with 16 rows and 16 columns depicted in FIG. 2 to a switching network with 32 rows and 32 columns. In this example partial switching networks 700 and 701 into which the switching network of FIG. 2 is split at the output side of the fourth switching stage ST₄ and similar partial switching networks 702 and 703 are disposed in parallel, switching stages $ST_a$, $ST_b$, $ST_c$ and $ST_d$ for the extension are place at the input sides of the partial switching networks 700, 701, 702 and 703, respectively, and switching elements are interconnected using the afore-mentioned link wiring algorithm.

In general, in the case of extending a switching network of a $2^n \times 2^n$ scale and with $\{m(n-1)+e\}$ switching stages (where $m \geq 1$ and $1 \geq e \geq n-1$) to a switching network of a $2^{n+1} \times 2^{n+1}$ scale, two sets of partial switching stages respectively split at the output side of a $\{s(n-1)+1\}$th (where $s=1, 2, \ldots$) switching stage are arranged in parallel, switching stages for extension are each disposed at the input sides of respective ones of the partial switching networks, and the switching elements are interconnected on the basis of the afore-mentioned link wiring algorithm. Thus, the extension can easily be achieved without involving such rewiring of the existing links. Further, it is added that the switching network of the present invention is operable with any desired number of switching stages so long as the number of switching stages is greater than n.

Figure 12:
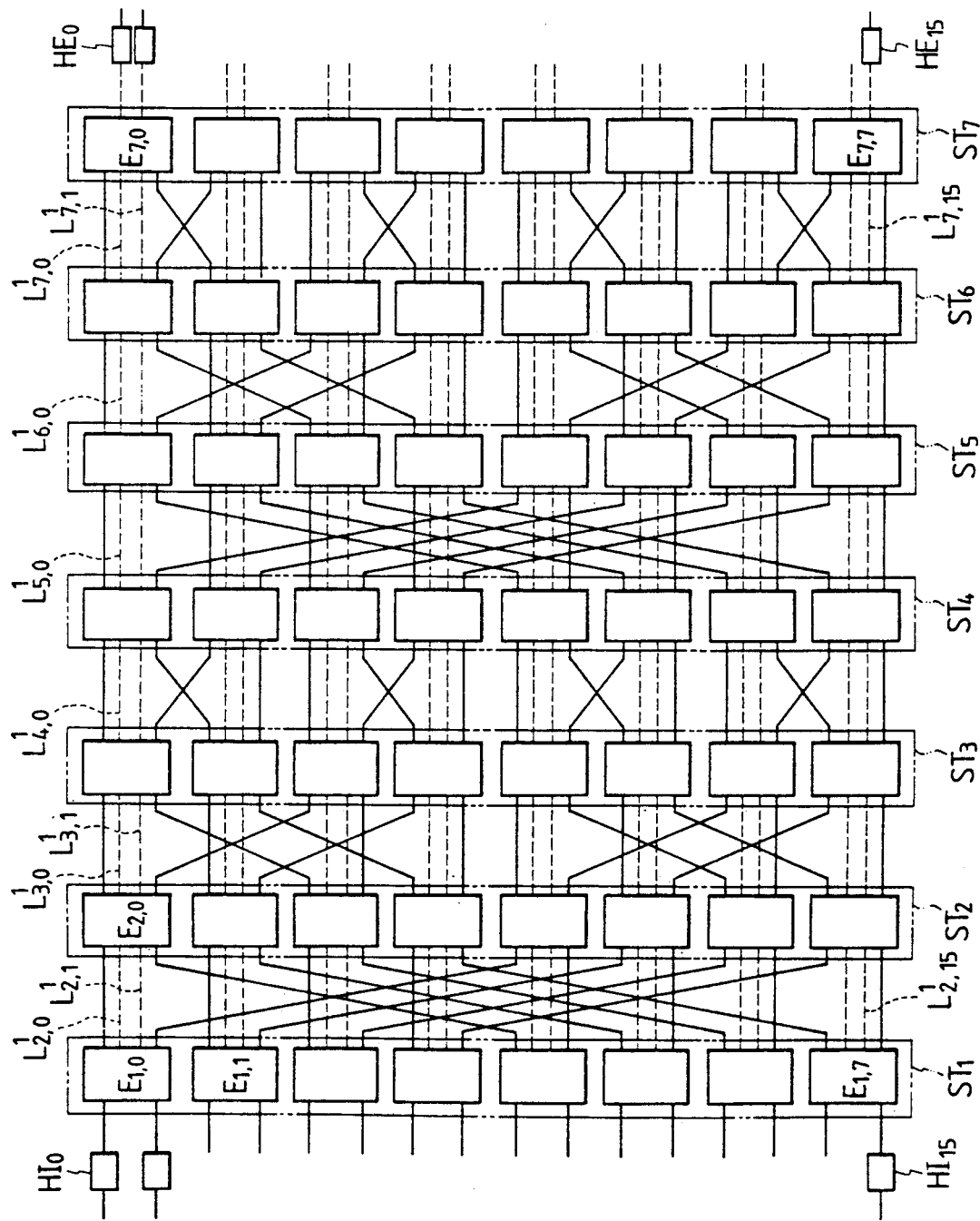
FIG. 12 is a block diagram illustrating another embodiment of the self-routing switch of the present invention.

FIG. 12 illustrates in block form another embodiment of the present invention (a modified form of the embodiment shown in FIG. 2).

In the embodiment of FIG. 12 all the switching elements $E_{j,i}$ of all the switching stages have the same structure as shown in FIG. 4 and the same link wiring algorithm is used also for connecting, via an equivalent link $L_{j,p}{}^1$, the output terminal $(p_{n-1}, p_{n-2}, \ldots, p_1, p_0)^1$ of the jth switching stage $ST_j$ which satisfies the condition $1 \leq j \leq n-1$, to an input terminal $(p_{n-1}, p_{n-2}, \ldots, p_1, p_0)^1$ at the same line position of the (j+1)th switching stage $ST_{j+1}$. The operation of each switching element is also identical with that in FIG. 4. This embodiment differs from that of FIG. 2 in that since the initial value of the remaining judge times R is not always n as described below.

Each routing information inserter HI determines, as described below, the initial value of the remaining judge times in the routing information of information data which is input into the switching network. Now, let the input line position and the specified output line position be represented by $(a_{n-1}, a_{n-2}, \ldots, a_1, a_0)$ and $(d_{n-1}, d_{n-2}, \ldots, d_1, d_0)$, respectively. If $(a_h, \ldots, a_1) = (d_h, \ldots, d_1)$ for a value h within a range $1 \leq h \leq n-1$, then the initial value of the remaining judge times R is set to (n−h), and this value is placed along with the initial judge times n at positions assigned to the remaining judge times and initial judge times value, respectively, in the format depicted in FIG. 3.

When a link contention occurs in a switching element of any switching stage, the remaining judge times R of information data having lost the contention is reset to the initial judge times value n.

It can be verified as in the afore-described embodiment that self-routing can be completed by the operation described above. Further, the processing of the initial value of the remaining judge times needs only to be performed at the time of setting a call, and at the time of information data transfer it is sufficient only to append the result of processing to the corresponding information data. With the construction of this embodiment, when information data has reached a switching element which has an output terminal at the same line position p as the intended output line even in the first to nth switching stages $ST_1$ to $ST_n$, the information data can immediately be sent from the switching element to the intended output line via the equivalent link. This increases the throughput of the switching network accordingly.

Figure 13:
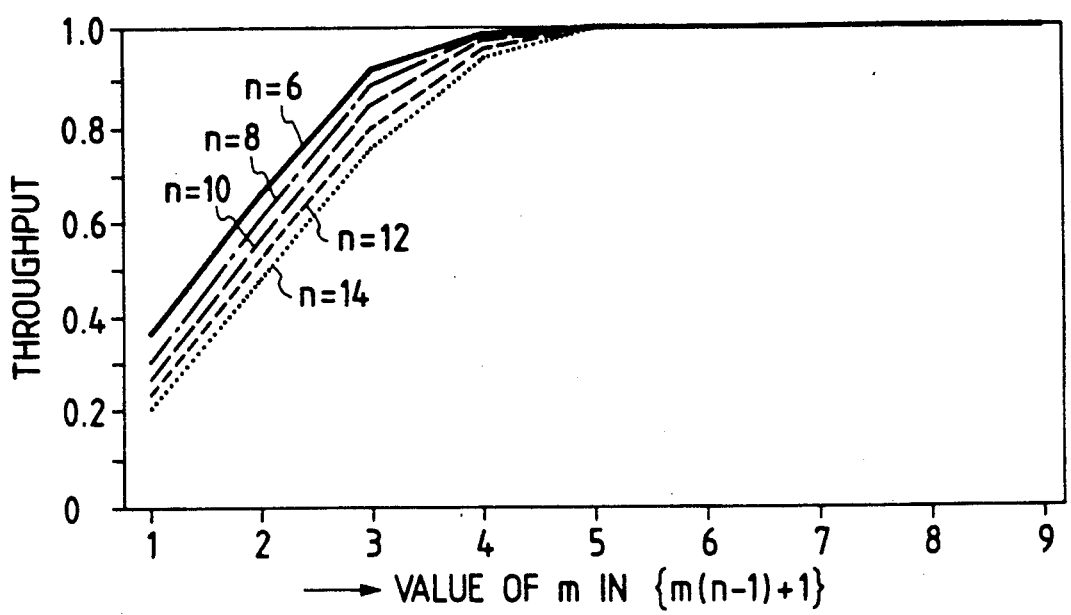
FIG. 13 is a graph showing the throughput characteristic of the self-routing switch of the present invention.

FIG. 13 shows the throughput characteristic of such a self-routing switch of the present invention, the abscissa representing the value m when the number of switching stages is expressed as $\{m(n-1)+1\}$. It is assumed that the input line utilization factor is 1, that loads are uniformly distributed, and that information data which has not reached the intended output line position is immediately abandoned. It will be seen that an increase in the number of switching stages increases the throughput toward 1.

Figure 14:
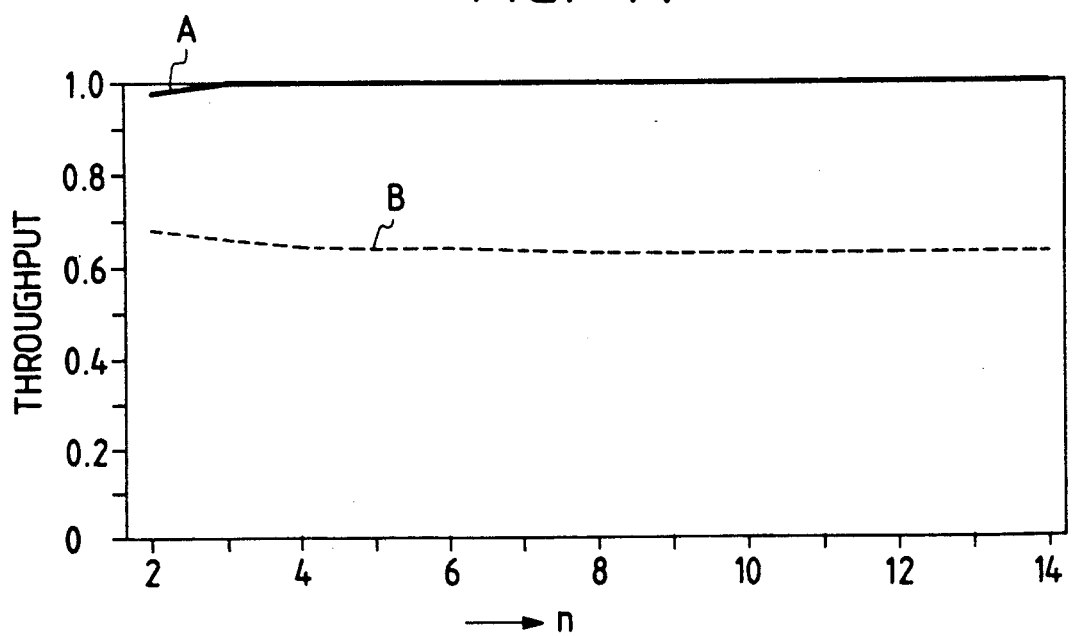
FIG. 14 is a graph showing, for comparison, the throughputs of the prior art and the present invention.

FIG. 14 is a diagram showing comparison in throughput between a switching network of aforementioned Hui et al literature and the self-routing switch in the case where they were provided with the same number of switching stages. It was assumed that the input line utilization factor was 1 and that loads were uniformly distributed. FIG. 14 reveals that the throughput of the self-routing switch of the present invention, indicated by A, is far more excellent than the throughput of the switching network according to Hui et al literature.

The embodiments described above are intended as merely illustrative of the present invention, and it is also possible to produce, within the scope of the technical concepts of the invention, other types of devices through utilization of known techniques, such as a switch which differs from the present invention only in the link wiring algorithm and effects routing control using the destination address and the remaining judge times as in the present invention: for example, a switch in which plurality of switching stages are wired by links in a perfect shuffle type and when a link contention occurs, the remaining judge times is reset to the initial value and link selection judge is again started at the highest order bit of the destination address; a switch which uses the number of times judged, not the remaining judge times, and when the value becomes equal to a predetermined judge times value, information data is output to an equivalent link; a switch in which each output controller is equipped with function of the central controller for selecting information data; and a switch which differs from the present invention in the control of the contention controller alone.

Figure 15:
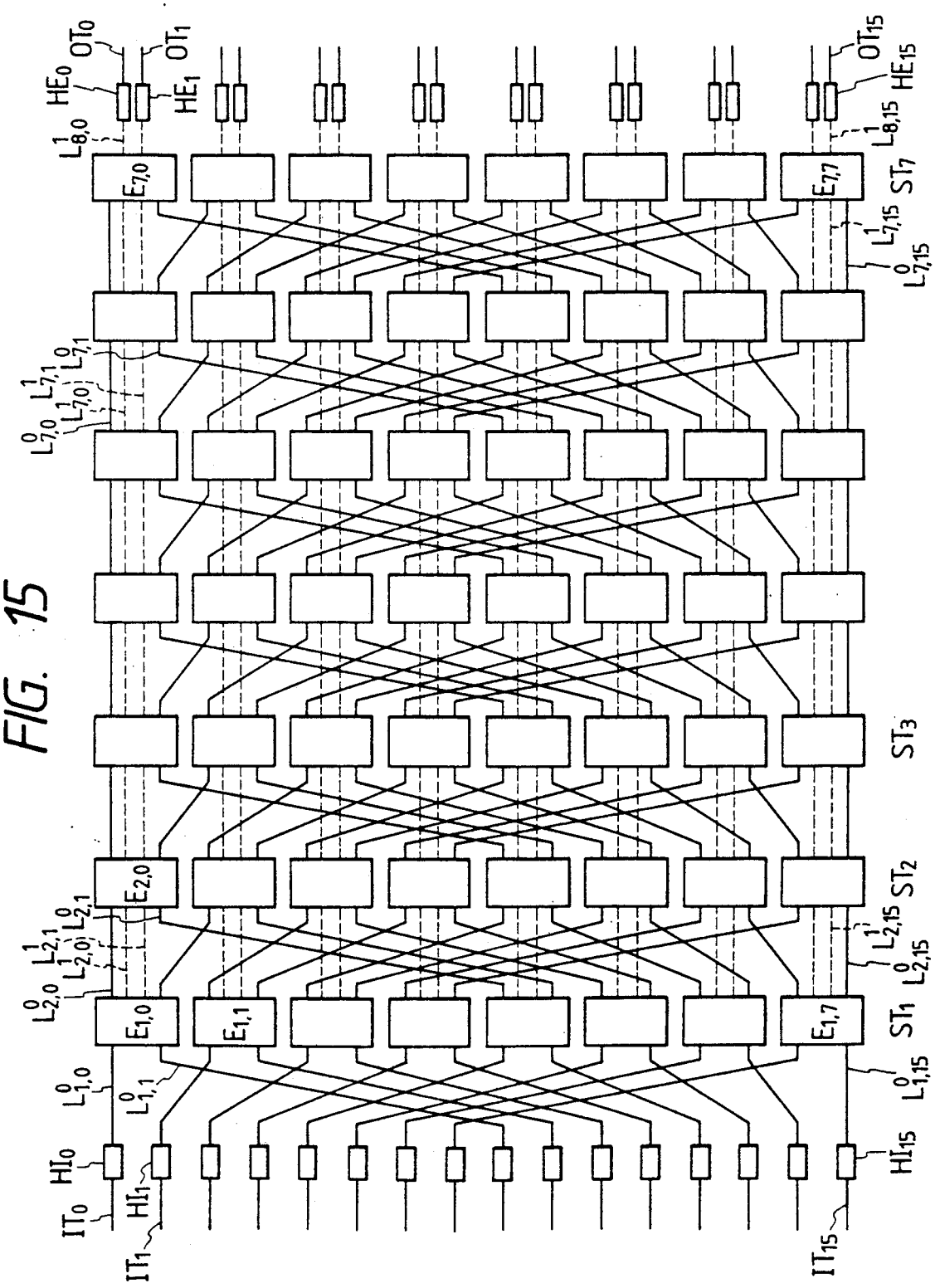
FIG. 15 is a block diagram illustrating another embodiment of the self-routing switch of the present invention.

FIG. 15 illustrates in block form an embodiment of the present invention (16×16) in which substitute links are connected in the perfect shuffle type. As in the case of FIG. 2, reference characters $IT_0$ to $IT_{15}$ indicate input lines, $OT_0$ to $OT_{15}$ output lines, HI to $HI_{15}$ routing information inserters, $HE_0$ to $HE_{15}$ routing information eliminators and $E_{1,0}$ to $E_{7,7}$ switching elements each of which selects the link to which information data should be output on the basis of the routing information appended to the information data. The switching elements $E_{j,0}$ to $E_{j,7}$ constitute a jth switching stage (where j=1 to 7). Reference characters $L_{1,0}$ to $L_{7,15}$ and $L_{2,0}^1$ to $L_{8,15}^1$ denote links for interconnecting the routing information inserters, the routing information eliminators and the switching elements. The solid-lined links (substitute links) and the broken-lined links (equivalent links) which are input to the jth switching stage are respectively identified by $L_{j,0}^0$ to $L_{j,15}^0$ and $L_{j,0}^1$ to $L_{j,15}^1$ from the top.

Further, as is the case with FIG. 2, the line positions p of the input and output terminals of the respective switching elements associated to the same type of links are counted $0, 1, \ldots, 15$ from the top of each switching stage and are each located at the line position $p = (p_3, p_2, p_1, p_0)$ represented in a binary form, and each terminal connected to the substitute link and each terminal connected to the equivalent link will hereinafter be referred to as terminals $(p_3, p_2, p_1, p_0)^0$ and $(p_3, p_2, p_1, p_0)^1$, respectively.

A description will be given first of the connection between the switching elements. The output terminal $(p_3, p_2, p_1, p_0)^0$ of the routing information inserter $HI_p$ at the line position $p = (p_3, p_2, p_1, p_0)$ is connected to the input terminal $(p_2, p_1, p_0, p_3)^0$ of the first switching stage $ST_1$; the output terminal $(p_3, p_2, p_1, p_0$ of the first switching stage $ST_1$ is connected via the substitute link to the input terminal $(p_2, p_1, p_0, p_3)^0$ of the second switching stage $ST_2$; the output terminal $(p_3, p_2, p_1, p_0)^0$ of the second switching stage $ST_2$ is connected via the substitute link to the input terminal $(p_2, p_1, p_0, p_3)^0$ of the third switching stage $ST_3$; the output terminal $(p_3, p_2, p_1, p_0)^0$ of the third switching stage $ST_3$ is connected via the substitute link to the input terminal $(p_2, p_1, p_0, p_3)$ of the fourth switching stage $ST_4$; and the input and output terminals of the subsequent switching stages are similarly connected.

The output terminal $(p_3, p_2, p_1, p_0)^1$ of the jth switching stage $ST_j$ (where $j \geq 1$) is connected via the equivalent link to the input terminal $(p_3, p_2, p_1, p_0)^1$ at the same line position in the (j+1)th switching stage $ST_{j+1}$. The output terminal $(p_3, p_2, p_1, p_0)^1$ of the final switching stage $ST_7$ is connected to the routing information eliminator $HE_p$ at the line position $p = (p_3, p_2, p_1, p_0)$.

The embodiment of FIG. 15 is a switch of a 16×16 scale. In general, the output terminal $(p_{n-1}, p_{n-2}, \ldots, p_0)^0$ of the routing information inserter $HI_p$ at the line position $p=(p_{n-1}, p_{n-2}, \ldots, p_0)$ is connected via the substitute link to the input terminal $(p_{n-2}, p_{n-3}, \ldots, p_1, p_0, p_{n-1})^0$ of the first switching stage $ST_1$; the output terminal $(p_{n-1}, p_{n-2}, \ldots, p_0)^0$ of the jth switching stage $ST_j$ (where $j \geq 1$) is connected via the substitute link to the input terminal $(p_{n-2}, p_{n-3}, \ldots, p_1, p_0, p_{n-1})^0$ of the (j+1)th switching stage $ST_{j+1}$; the output terminal $(p_{n-1}, p_{n-2}, \ldots, p_0)^1$ of the jth switching stage $ST_j$ is connected via the equivalent link to the broken-lined input terminal $(p_{n-1}, p_{n-2}, \ldots, p_0)^1$ of the (j+1)th switching stage $ST_{j+1}$; and the output terminal $(p_{n-1}, p_{n-2}, \ldots p_0)^1$ of the final switching stage $ST_7$ is connected to the routing information eliminator $HE_p$ at the line position $p=(p_{n-1}, p_{n-2} \ldots, p_0)$.

Next, a description will be given of the operation of the switching network depicted in FIG. 15.

The routing from the routing information inserter HI to the routing information eliminator HE is determined according to the destination address and the remaining judge times appended to information data. The routing information inserter HI appends the destination address and the initial value n (n=4 in this case) of the remaining judge times R to information data which is input from the input line IT, and if necessary, an initial judge times value which is equal to the initial value n of the remaining judge times R is appended to the information data. The routing information eliminator HE eliminates these pieces of routing information from the information data transferred thereto.

The address of the routing information eliminator $HE_p$ is $(d_3, d_2, d_1, d_0)$ in the binary notation and is represented here by $p=(d_3 \cdot 2^3 + d_2 \cdot 2^2 + d_1 \cdot 2^1 + d_0 \cdot 2^0)$.

Each switching element $E_{j,i}$ performs a selective link connection in accordance with the value of the bit at an Rth digit (i.e. a judge bit $d_{R-1}$) among the address bits $d_0$, $d_1$, $d_2$ and $d_3$ which corresponds to the remaining judge times R, and when the judge bit provides successful link connection, the remaining judge times R is decremented by one. For example, since the remaining judge times R is n in the initial state, a selective link connection is carried out according to the value of a judge bit $d_{n-1}$ and the remaining judge times R is decremented to (n-1), and in the next subsequent stage a selective link connection is effected using a judge bit $d_{n-2}$.

Figure 16:
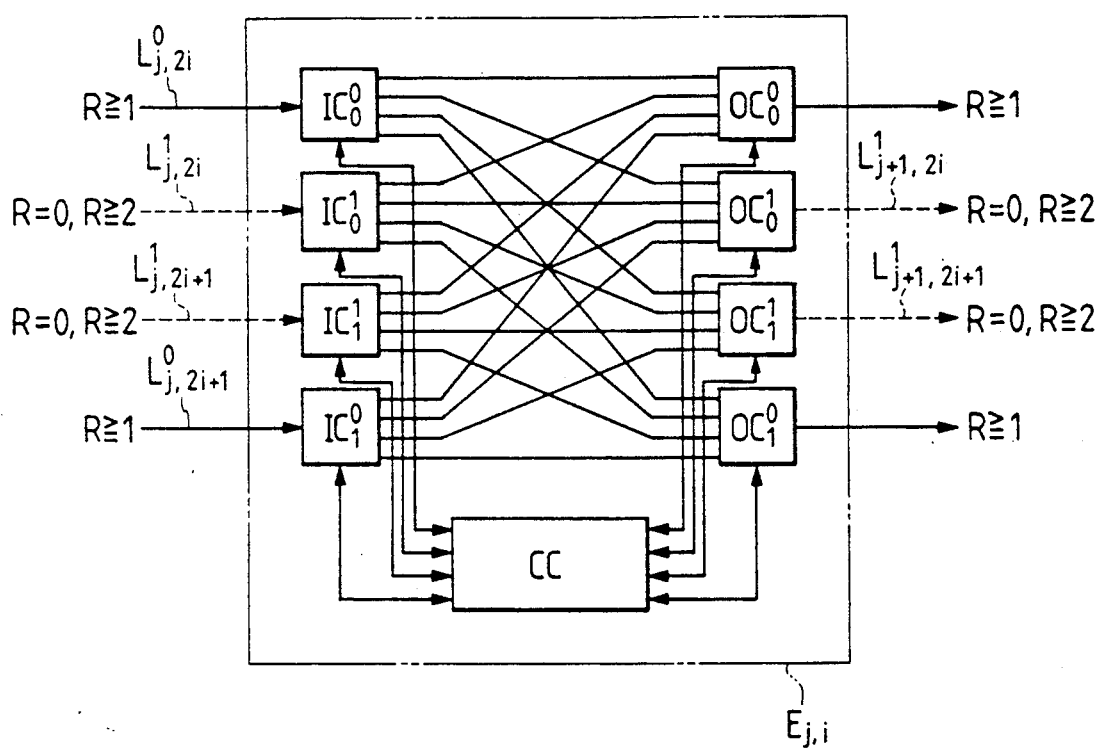
FIG. 16 is a block diagram showing an example of the structure of each switching element $E_{j,i}$ in FIG. 15.

FIG. 16 is a block diagram illustrating an example of the structure of the switching element $E_{j,i}$ in FIG. 15.

In FIG. 16, reference characters $IC_0^0$, $IC_0^1$, $IC_1^1$ and $IC_1^0$ indicate input controllers, which will hereinafter be identified also by $IC_l^b$ (where b=0 or 1 and l=0 or 1); CC designates a central controller; $OC_0^0$, $OC_0^1$, $OC_1^1$ and $OC_1^0$ denote output controllers, which will be identified also by $OC_l^b$. The output controllers $OC_0^0$ and $OC_1^0$ provide permanent connections and do not perform any control operation.

The input controller $IC_l^b$ temporarily stores information data input thereinto from a link on the input side and sends the routing information to the central controller CC. The central controller CC interprets pieces of routing information which are sent from a maximum of four input controllers $IC_l^b$, judges output controllers $OC_l^b$ to which the information data input into the input controllers $IC_l^b$ should be transferred, and controls the input controllers $IC_l^b$ accordingly. Consequently, a maximum of four pieces of information data can be transferred from the input controllers $IC_l^b$ to the output controllers $OC_l^b$ at the same time.

The decision for connection and processing of the routing information in the switching element $E_{j,i}$ follow, for example, rules for connection described below. In the following description, the remaining judge times attached to information data which are input into the jth switching stage from an input substitute link $L_{j,2i+l}^0$ and an input equivalent link $L_{j,2i+l}^1$ (where l=0 or 1) will be identified by $R_l^0$ and $R_l^1$, respectively, or $R_l^b$ (where b=0 or 1: in the case of the former, the substitute link is meant and in the case of the latter the equivalent link is meant), and the judge bits will be identified by $D_l^0$ and $D_l^1$, respectively, or $D_l^b$. Incidentally the connection is performed for information data only when an active bit attached thereto as described later is active, but this is not related directly to the present invention.

EXAMPLE OF RULES FOR CONNECTION

Condition 1

The remaining judge times $R_l^0$ and $R_l^1$ of all pieces (four or less) of information data in the input controllers $IC_l^b$ (where l=0 or 1 and b=0 or 1) are equal to or greater than 2.

Rule 1: Normally, each information data is connected to the output controller $OC_0^0$ or $OC_1^0$ depending on whether the judge bit $D_l^b$ is 0 or 1, and the remaining judge times is decremented by one, where the judge bit $D_l^b$ is represented by a bit at the $(R_l^b)$th digit in the destination address $(d_3, d_2, d_1, d_0)$ attached to the information data, that is, a bit $d_{f-1}$, where f is the value of the remaining judge times $R_l^b$, that is, $R_l^b=f$.

Rule 2: Where the judge bits $D_l^b$ or three of all (four or less) pieces of information data in the four input controllers $IC_l^b$ are equal at the same time, that one of these pieces of information data which has won a link contention is connected following Rule 1. The other piece or pieces of information data are each connected to the output controller $OC_0^1$ or $OC_1^1$ and their remaining judge times $R_l^b$ are held unchanged. In the link contention a higher priority is given to the information data of smaller remaining judge times, for instance. If a plurality of pieces of information data are equal in the remaining judge times, priorities are attached to them randomly or in the order of arrangement of the input controllers $IC_l^b$, for example.

Rule 3: Where four pieces of information data are simultaneously input into the four input controllers $IC_l^b$ and their judge bits $D_l^b$ are all 0s or 1s, up to three of the four pieces of information data can be connected according to the same rule as Rule 2. The remaining information data is connected to that one of the output controllers $OC_l^0$ (where l=0 or 1) which is available at that time, and its remaining judge times $R_l^b$ is reset to the initial value n.

Condition 2

The remaining judge times $R_l^b$ of one of all pieces (four or less) of information data in the four input controllers $IC_l^b$ is 1 or 0.

Rule 4: When the remaining judge times $R_l^b$ of the above-mentioned information data is 1, the information data is one that was input from the substitute link $L_{j,2i+l}^0$ to the input controller $IC_l^0$ (l=0 or 1). If the judge bit $D_l^b=d_0$ in the destination address bit string is 0, then the input information data is preferentially connected to the output controller $OC_0^1$, and if the judge bit is 1, then the input information data is preferentially connected to the output controller $OC_1^1$ and the remaining judge times is decremented to 0. When the remaining judge times $R_l^b$ of the input information data is 0, the information data is such one that was input from the equivalent link $L_{j,2i+l}^1$ to the input controller $IC_l^1$ (l=0 or 1), and it is preferentially connected to the output controller $OC_l^1$ of the same suffix 1 and the remaining judge times $R_l$ is kept unchanged at 0.

Rule 5: In the case where the other pieces (three or less) of information data each have a remaining judge times $R_l^b \geq 2$ and the judge bits $D_l^b$ of these remaining pieces of information data are all 0s or all 1s, at most two pieces of information data can be connected according to the same rule as Rule 2. The remaining information data is connected to that one of the output controllers $OC_l^p$ (where l=0 or 1) which is available at that time, and its remaining judge times $R_l^b$ is reset to the initial value n.

Condition 3

The remaining judge times $R_l^b$ of two of all (four or less) pieces of information data in the four input controllers $IC^b$ are either 1 or 0.

Rule 6: The two pieces of information data whose remaining judge times $R_l^b$ is 1 or 0 are each connected according to Rule 4 mentioned above provided that if they contends for the same link, then one of them is stored in a buffer provided in one of the input or output controllers so as to temporarily resolve the contention. The remaining judge times R of the other pieces of information data are equal to or greater than 2, and on the basis of their judge bits, these pieces of information data are connected according to Rule 2 mentioned above. In the case where four pieces of information data are present in the four input controllers and the judge bits of the other two pieces of information data whose remaining judge times are neither 1 nor 0 (i.e. $R \geq 2$), are both 0s or 1s, one of the two pieces of information data can be connected according to Rule 2, but the other information data cannot be connected according to Rule 2 and hence is connected to that one of the output controllers $OC_l^p$ which is available at that time, and the remaining judge times $R_l^b$ is reset to the initial value n.

Condition 4

The remaining judge times of three or more pieces of information data are either 1 or 0.

Rule 7: In this instance, an output link contention is temporarily resolved by using the buffer provided in the input controllers $IC_l^b$ or output controllers $OC_l^1$.

Selective link connection is repeatedly performed in accordance with the above-described connection rules until information data reaches its specified output line position.

Next, the selective link connection control, which the switching element $E_{j,i}$ shown in FIG. 16 performs, will be described with reference to control operation algorithms of the input controller $IC_l^b$, the central controller CC and the output controller $OC_l^b$ depicted in FIGS. 17A, 17B and 17C, respectively.

Figure 17A:
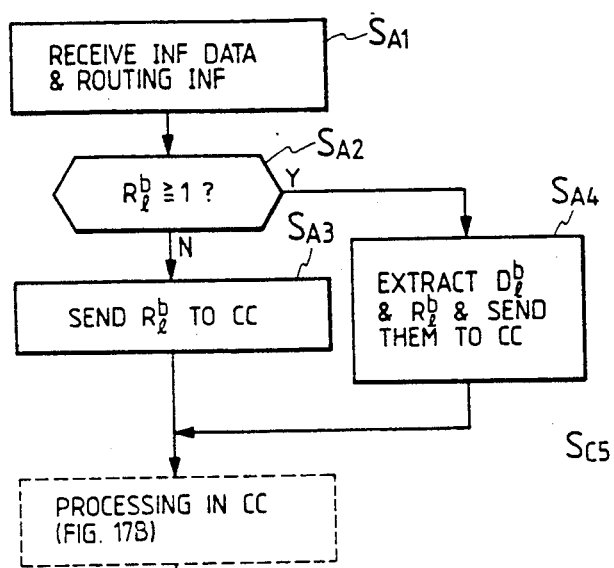
FIG. 17A is a flowchart showing the control procedure in each input controller IC in FIG. 16.
Figure 17C:
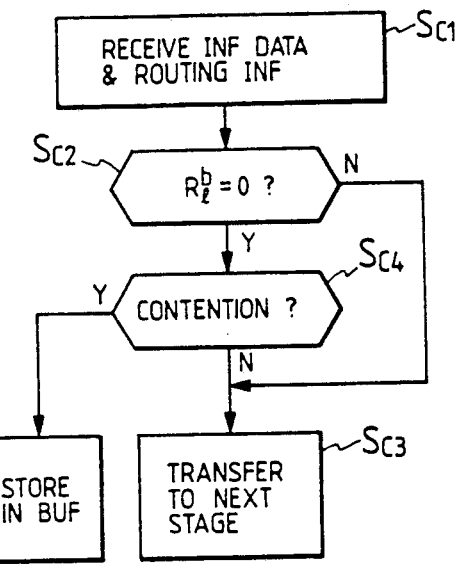
FIG. 17C is a flowchart showing the control procedure in the output controller OC in FIG. 16.
Figure 17C:
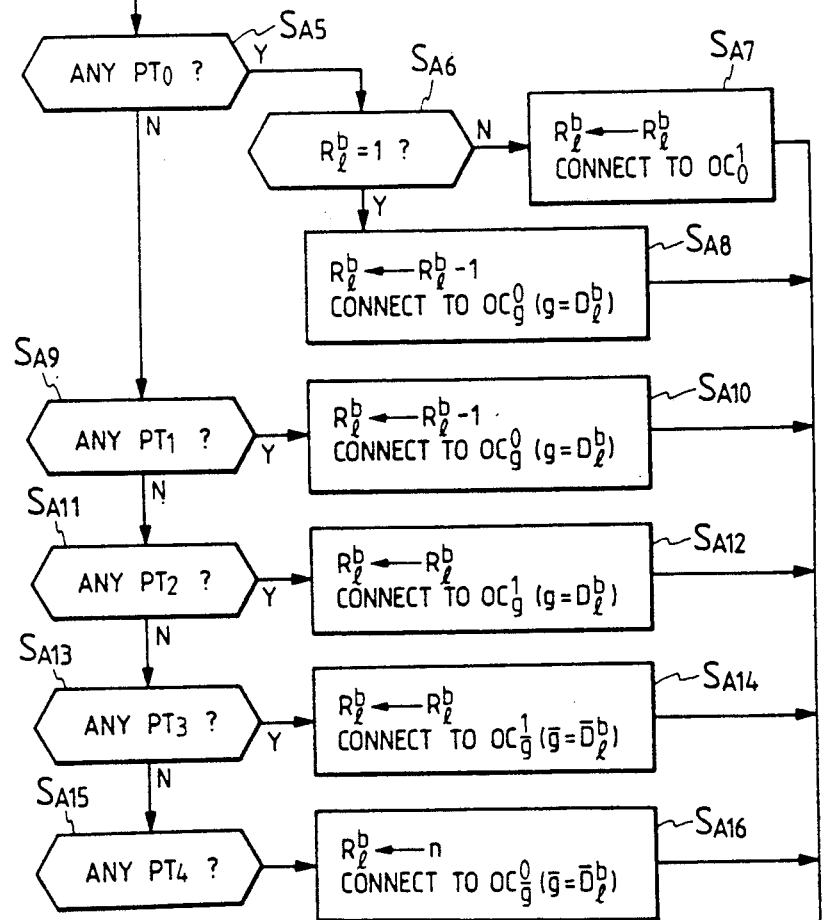

When information data is input from the input link $L_{j,2i+l}^b$ (where b=0 means the substitute link and b=1 the equivalent link), the input controller $IC_l^b$ temporarily stores the information data in step $S_{A1}$ in FIG. 17A and in step $S_{A2}$ extracts the remaining judge times $R_l^b$ from the routing information attached to the information data and determines whether or not $R_l^b \geq 1$. If not (i.e. $R_l^b = 0$), then the input controller $IC_l^b$ proceeds to step $S_{A3}$ in which it sends the remaining judge times $R_l^b$ to the central controller CC, and the process is switched to its control operation shown in FIG. 17B. If it is determined in step $S_{A2}$ that $R_l^b \geq 1$, then the input controller proceeds to step $S_{A4}$, in which the judge bit $D_l^b = d_f$, where f=$(R_l^b - 1)$, is extracted from the routing information and sent to the central controller CC together with the remaining judge times $R_l^b$. $R_l^b = 0$ means that the information data has already reached the same line position p as the intended destination, and consequently, such information data has been transferred to the switching element $E_{j,i}$ via the equivalent link $L_{j,2i+l}^1$ alone.

As shown in FIG. 17B, the central controller CC first receives, in step $S_{B1}$, the remaining judge times $R_l^b$ and the judge bit $D_l^b$ from each input controller $IC_l^b$ which has stored therein information data (Information data is not always stored in all the input controllers.) and in step $S_{B2}$ sends a pattern signal $PT_0$ to the input controller $IC_l^b$ which sent the remaining judge times $R_l^b = 0$ or 1. Then the central controller CC proceeds to step $S_{B3}$. The pattern signal $PT_0$ is an instruction signal by which the information data with the remaining judge times $R_l^b = 0$ or 1 is preferentially transferred to the output controller connected to the equivalent link. The subsequent control procedure is entirely directed to those information data with the remaining judge times $R_l^b \geq 2$. In this example the link connections for those pieces of information data with the judge bits $D_l^b = 0$ are decided in steps $S_{B4}$ through $S_{B12}$ and the link connections for those pieces of information data with the judge bits $D_l^b = 1$ are decided in steps $S_{B13}$ through $S_{B21}$.

In step $S_{B4}$ a pattern signal $PT_1$ is sent to the input controller $IC_l^b$ which sent to the central controller CC the information data with the judge bit $D_l^b = 0$ and with the smallest remaining judge times $R_l^b$. Next, it is determined in step $S_{B5}$ whether or not the judge bits of any other information data are $D_l^b = 0$. If not, the process proceeds to step $S_{B13}$, and if such a judge bit is found, then it is determined in step $S_{B6}$ whether or not the output link $L_{j+1,2i}^1$ of the output controller $OC_0^1$ is available. If available, the central controller CC returns, in step $S_{B7}$, a pattern signal $PT_2$ to the input controller $IC_l^b$ which sent thereto the judge bit ($D_l^b = 0$) and the second smallest remaining judge times $R_l^b$, and then the central controller CC proceeds to step $S_{B8}$. It is determined in step $S_{B8}$ whether or not there is any other information data with the judge bit $D_l^b = 0$, and if not, the process proceeds to step $S_{B13}$, and if such information data is found, the process proceeds to step $S_{B9}$. When it is decided in step $S_{B6}$ that the output link of the output controller $OC_0^1$ is not available, the central controller CC proceeds to step $S_{B9}$.

The unavailability of the output link of the output controller $OC_0^1$ means that there was in step $S_{B2}$ the information data with the remaining judge times $R_l^b = 0$ or 1 which should be connected to the output controller $OC_0^1$. This implies therefore that the transfer of information data to two output controllers $OC_l^b$ has been decided so far. The numerals written adjacent the paths in the flowchart of FIG. 17B indicate the least possible numbers of information data decided for link connection until then.

It is determined in step $S_{B9}$ whether or not the output link $L_{j+1,2i+1}^1$ of the output controller $OC_1^1$ is available, and if not, the process proceeds to step $S_{B12}$. If available, the central controller CC sends a pattern signal $PT_3$ to the input controller $IC_l^b$ which sent thereto the judge bit $D_l^b = 0$ and the next smallest remaining judge times $R_l^b$ in step $S_{B10}$. When it is decided in step $S_{B11}$ that there is no other judge bit $D_l^b = 0$, the process proceeds to step $S_{B13}$. When it is decided that such a judge bit is still present, the process proceeds to step $S_{B12}$. In step $S_{B12}$ the central controller CC sends a pattern signal $PT_4$ to the input controller $IC_l^b$ which sent thereto the last judge bit $D_l^b=0$. Thus, the link connections for the four pieces of information data have all been decided, and consequently, the process shifts to step $S_{A5}$ in FIG. 17A.

In steps $S_{B13}$ to $S_{B21}$ the same process as that effected for the judge bit $D_l^b=0$ in steps $S_{B4}$ to $S_{B12}$ is performed, after which the process shifts to step $S_{A5}$ in FIG. 17A. In this instance, however, the order of preferential selection of the output links according to steps $S_{B13}$ to $S_{B21}$ is reverse to that according to steps $S_{B4}$ to $S_{B12}$. Moreover, if the judge bit $D_l^b=1$ is not found in steps $S_{B14}$, $S_{B17}$ and $S_{B20}$, the process immediately shifts to step $S_{A5}$ in FIG. 17A. Incidentally, the availability of the links connected to the output controllers $OC_l^b$ is placed under control of the central controller CC. Further, in the case where there are a plurality of remaining judge times of the same smallest value in steps $S_{B4}$, $S_{B7}$, $S_{B10}$, $S_{B13}$, $S_{B19}$, etc., one of them is selected randomly or in the order of arrangement of the input controllers $IC_0^0$, $IC_0^1$, $IC_1^1$ and $IC_1^0$ or in an order opposite thereto, or some other suitable methods can be adopted.

Turning back to FIG. 17A, it is determined in step $S_{A5}$ whether the input controller $IC_l^b$ has received the pattern signal $PT_0$ from the central controller CC, and if so, it is determined in step $S_{A6}$ whether the remaining judge times is $R_l^b=1$ or not. $R_l^b \neq 1$, that is, $R_l^b=0$ (see steps $S_{B2}$ in FIG. 17B), means that the corresponding information data has already reached the same line position as the intended one, and consequently, the information data has been input from the equivalent link $L_{j,2i+l}^1$. In step $S_{A7}$ the information data is sent, with the value of the remaining judge times $R_l^b=0$ held unchanged, to the output controller $OC_l^1$ of the same l as that of the input controller. When it is decided in step $S_{A6}$ that $R_l^b=1$, then the remaining judge times $R_l^b$ is decremented by one, after which the information data is sent to the output controller $IC_g^1$ (where g is the value 0 or 1 of the judge bit $D_l^b$). If it is decided in step $S_{A5}$ that the input controller has not received the pattern signal $PT_0$, then it is determined in step $S_{A9}$ whether or not the input controller has received the pattern signal $PT_1$. If so, the remaining judge times $R_l^b$ is decremented by one and the information data is sent to the output controller $OC_g^0$ specified by the value g of the judge bit $D_l^b$ in step $S_{A10}$. If it is decided in step $S_{A9}$ that the pattern signal $PT_1$ has not been received, then it is determined in step $S_{A11}$ whether or not the pattern signal $PT_2$ has been received, and if so, the process proceeds to step $S_{A12}$. The fact that a certain input controller $IC_l^b$ has received the pattern signal $PT_2$ from the central controller CC means that the pattern signal $PT_1$ was sent to another input controller $IC_l^b$, as will be seen from the flowchart of FIG. 17B. In addition, it should be remembered that the pattern signals $PT_1$ to $PT_4$ are generated in step $S_{B4}$ and the subsequent steps, that is, in the cases where the remaining judge times are all $R_l^b \geq 2$.

Since information data has been sent to the output controller $OC_g^0$ connected to the output substitute link in step $S_{A10}$ of the processing in the above-mentioned another input controller, the present input controller which is performing the processing described above in respect of FIG. 17A sends, in step $S_{A12}$, information data with the remaining judge times $R_l^b$ held unchanged to the output controller $OC_g^1$ connected to the output equivalent link. If it is decided in step $S_{A11}$ that the pattern signal $PT_2$ has not been received, then it is determined in step $S_{A13}$ whether or not the pattern signal $PT_3$ has been received. If received, the input controller sends the information data, without changing the value of the remaining judge times $R_l^b$, to the output controller $OC(1/g)$ connected to the equivalent link. $\bar{g}$ indicates the inverted logic of the judge bit $D_l^b$. If it is decided in step $S_{A13}$ that the input controller has not received the pattern signal $PT_3$, then it is determined in step $S_{A15}$ whether or not the input controller has received the pattern signal $PT_4$. If it is decided that the input controller has received the pattern signal $PT_4$, then in step $S_{A16}$ the input controller resets the remaining judge times $R_l^b$ to the initial value n and the information data to the output controller $OC(0/\bar{g})$ opposite to that specified by the value of the judge bit $D_l^b$. Since FIG. 17A shows the processing which each input controller $IC_l^b$ performs as a result of receiving information data from the preceding stage, the input controller surely receives one of the pattern signals $PT_0$ through $PT_4$. Accordingly, when it is decided in step $S_{A13}$ that the input controller has not received the pattern signal $PT_3$, it means that the input controller has received the pattern signal $PT_4$. Therefore, the process may also proceed directly to step $S_{A16}$, skipping over step $S_{A15}$. When information data is sent out in any one of steps $S_{A7}$, $S_{A8}$, $S_{A10}$, $S_{A12}$, $S_{A14}$ and $S_{A16}$, the process of the output controller $OC_l^1$ shown in FIG. 17C is started.

When having received information data from the input controller $IC_l^1$ in step $S_{C1}$, the output controller $OC_l^1$ fetches the remaining judge times $R_l^b$ from the received information data and determines in step $S_{C2}$ whether or not the remaining judge times is 0. If not, the process proceeds to step $S_{C3}$, in which the output controller sends out the information data to the next switching stage $ST_{j+1}$. If the remaining judge times is 0, then it is determined in step $S_{C4}$ whether or not an output link contention has occurred, and if not, the output controller sends out the information data to the next switching stage. When the output link contention has occurred, the output controller temporarily stores the information data in its buffer in step $S_{C5}$.

Figure 18:
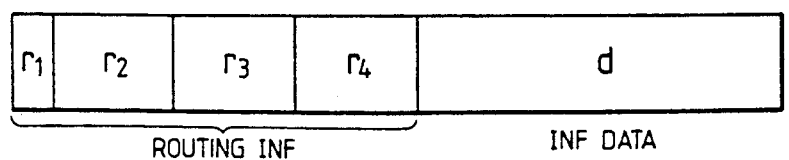
FIG. 18 is a diagram showing an example of the format of routing information attached to information data.

FIG. 18 is a schematic diagram showing an example of the format of the routing information which is appended to information data. In FIG. 18, reference character $r_1$ denotes an active bit which indicates the validity/invalidity of information data $r_2$ a bit string which indicates the destination address, $r_3$ a bit string which indicates the remaining judge times, $r_4$ a bit string which indicates the initial judge times value and d information data.

Figure 19:
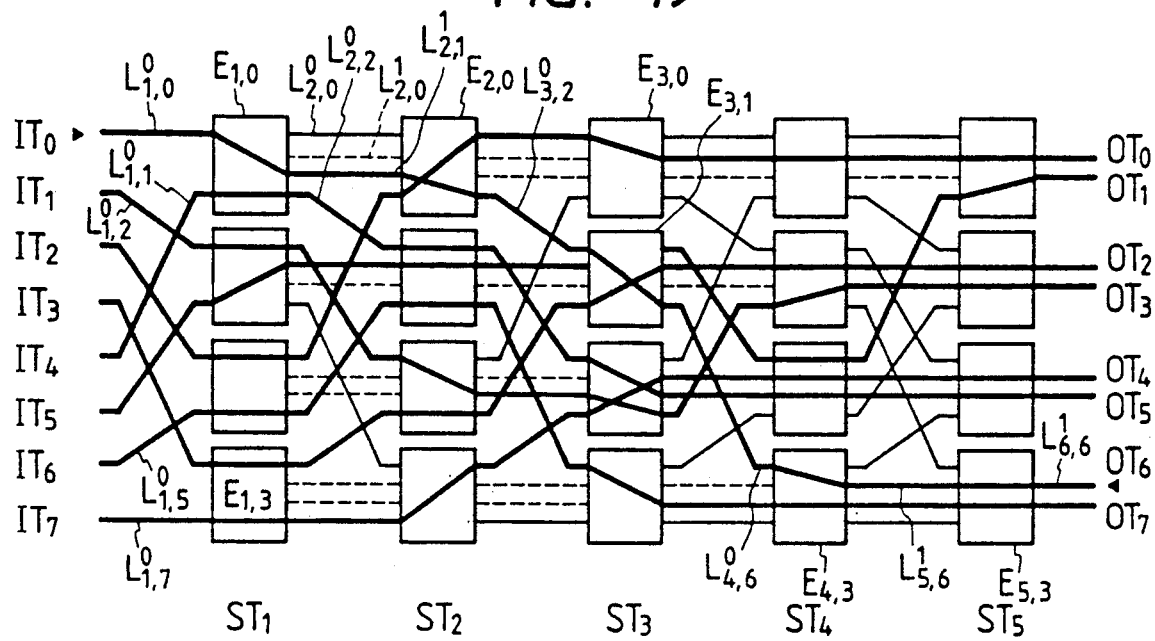
FIG. 19 is a block diagram of a small scale switch, for explaining an example of routing in the embodiment of FIG. 15.

FIG. 19 is a diagram showing an example of routing in the self-routing switch of the present invention which is of the perfect shuffle type. For better understanding, the switch is shown to have only eight lines and five switching stages. In this example, the input lines $IT_0$ to $IT_7$ and the output lines $OT_0$ to $OT_7$ are respectively connected as follows: $IT_0$-$OT_6$, $IT_1$-$OT_3$, $IT_2$-$OT_0$, $IT_3$-$OT_2$, $IT_4$-$OT_5$, $IT_5$-$OT_1$, $IT_6$-$OT_7$, and $IT_7$-$OT_4$.

Consider routing from the input line $IT_0$ to the output line $OT_6$. Prior to its input into the first switching stage $ST_1$ information data is appended with a destination address $(d_2, d_1, d_0) = (1, 1, 0) = 6$ and the remaining judge times 3 as routing information. In a switching element $E_{1,0}$, since the remaining judge times R is 3, the information data ought to be connected to the solid-line lower output terminal (connected to a substitute link $L_{2,2}^0$) according to the bit $d_{R-1}=d_2=1$, but due to a link contention, the information data is connected to the broken-lined lower output terminal (connected to an equivalent link $L_{2,1}^1$) with the remaining judge times held unchanged. Thus the information data is transferred to a switching element $E_{2,0}$ without decrementing the remaining judge times $R=3$.

In the switching element $E_{2,0}$, since $R=3$, reference is made again to the same judge bit $d_2=1$, from which it is known that the connection of the information data to the solid-lined lower output terminal (connected to a substitute link $L_{3,2}^0$) is desired. At this time, since no link contention occurs, the remaining judge times R is decremented by one and the information data is output to the solid-lined lower output terminal, from which it is transferred via the link $L_{3,2}^0$ to a switching element $E_{3,1}$.

In the switching element $E_{3,1}$, since the remaining judge times r is 2, the information data ought to be connected to the solid-lined lower output terminal on the basis of the judge bit $d_1=1$. Since no link contention occurs, the information data is connected to the solid-lined lower output terminal, from which it is transferred via a substitute link $L_{4,6}^0$ to a switching element $E_{4,3}$, together with the remaining judge times R decremented by one to 1. In the switching element $E_{4,3}$, since the remaining judge times R is 1 and $d_0=0$, the information data is connected to the broken-line upper output terminal, from which it is transferred via an equivalent link $L_{5,6}^1$ to a switching element $E_{5,3}$, together with the remaining judge times R decremented by one to 0. In the switching element $E_{5,3}$, since the remaining judge times R is 0, the information data is connected to the broken-lined output terminal at the same line position as in the preceding stage. In this way, the information data is finally transferred via an equivalent link $L_{6,6}^1$ to the intended routing information eliminator (not shown).

In the embodiment of FIG. 2, when a link contention occurs, the remaining judge times R is reset to its initial value n. The reason for this is that since the link wiring between the respective switching stages changes for each interstage, routing for information data having lost the link contention must be restarted in the subsequent switching stages. In contrast thereto, according to the perfect shuffle type embodiment of FIG. 15, wiring of the full-lined links (substitute links) is exactly the same between any switching stages, and information data can surely be transferred to its specified output line position by performing, four times in all, the switching of line position through the selective connection of the substitute links (three times) and equivalent link (one time). In the switching stages succeeding the stage where the intended line position has been reached, the information data is not subjected to the selective link connecting process, and hence it is output directly from the final switching stage via equivalent links at the same line position as that of the intended output line. However, since the equivalent links are each used also as a link for avoiding a link contention in each switching element, the probability of the equivalent links being occupied is high accordingly. This reduces the throughput of the switch.

Figure 20:
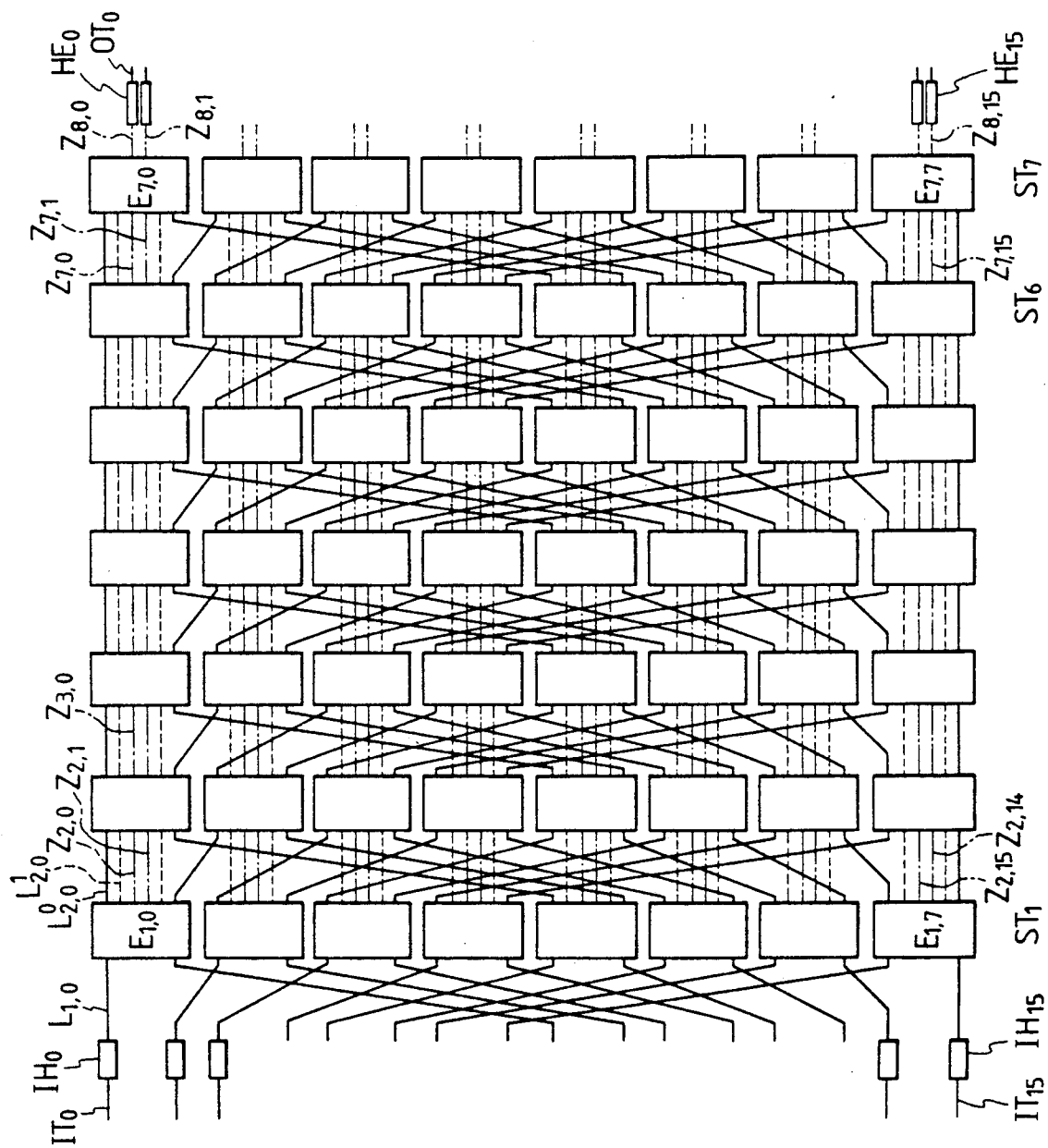
FIG. 20 is a block diagram illustrating still another embodiment of the present invention.

FIG. 20 illustrates an embodiment of the perfect shuffle type switch which is designed for obviating the above-mentioned defect of the embodiment of FIG. 15. The connection of substitute links indicated by the full lines and the connection of equivalent links indicated by the broken lines are exactly identical with those in FIG. 15. Between switching elements in FIG. 20 two through links $Z_{j,2i+l}$ indicated by one-dotted chain lines are provided in parallel to two aforementioned equivalent links $L_{j,2i+l}^l$ (where $l=0$ or 1). While in this embodiment the through links are provided between all the switching stages, the through links from the first to nth switching stages may also be omitted.

Figure 21:
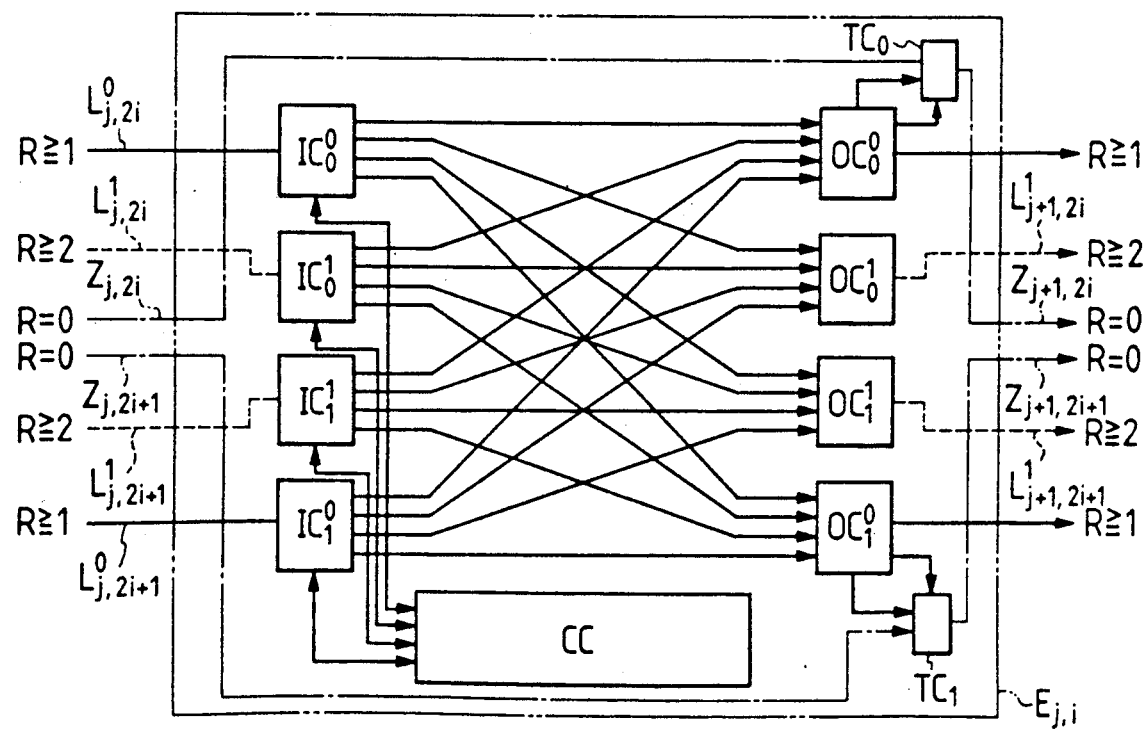
FIG. 21 is a block diagram showing the structure of each switching element $E_{j,i}$ in FIG. 20.

FIG. 21 shows the structure of each switching element in each switching stage $ST_j$. This structure is similar to a combination of the switching element structure of FIG. 16 with contention controllers $TC_l$ ($l=0$ or 1) and through links $Z_{j,2i+l}$ ($l=0$ or 1) except that the central controller CC does not need to watch the availability of output links connected to the output controllers $OC_l^p$. The through link $Z_{j,2i+l}$ on the input side is connected via the contention controller $TC_l$ to the through link $Z_{j+1,2i+l}$ of the next switching stage without being passed through any input controller. The through link $Z_{j,2i+l}$ ($j=2, 3, \ldots$) forms an exclusive through path for transferring information data of the remaining judge times $R=0$, and the information data with $R=0$ is provided on this through path from the output controller $OC_l^p$ via the contention controller $TC_l$. In other words, the through link $Z_{j,2i+l}^1$ and the contention controller $TC_l$ correspond to the equivalent link $L_{j,2i+l}^1$ and the contention controller $TC_l$ in FIG. 4. On the other hand, the equivalent link $L_{j,2i+l}^1$ in FIG. 21 functions as an exclusive link for avoiding a link contention in the substitute link $L_{j+1,2i+l}^p$. Accordingly, a switch of a high throughput can be obtained.

Figure 22A:
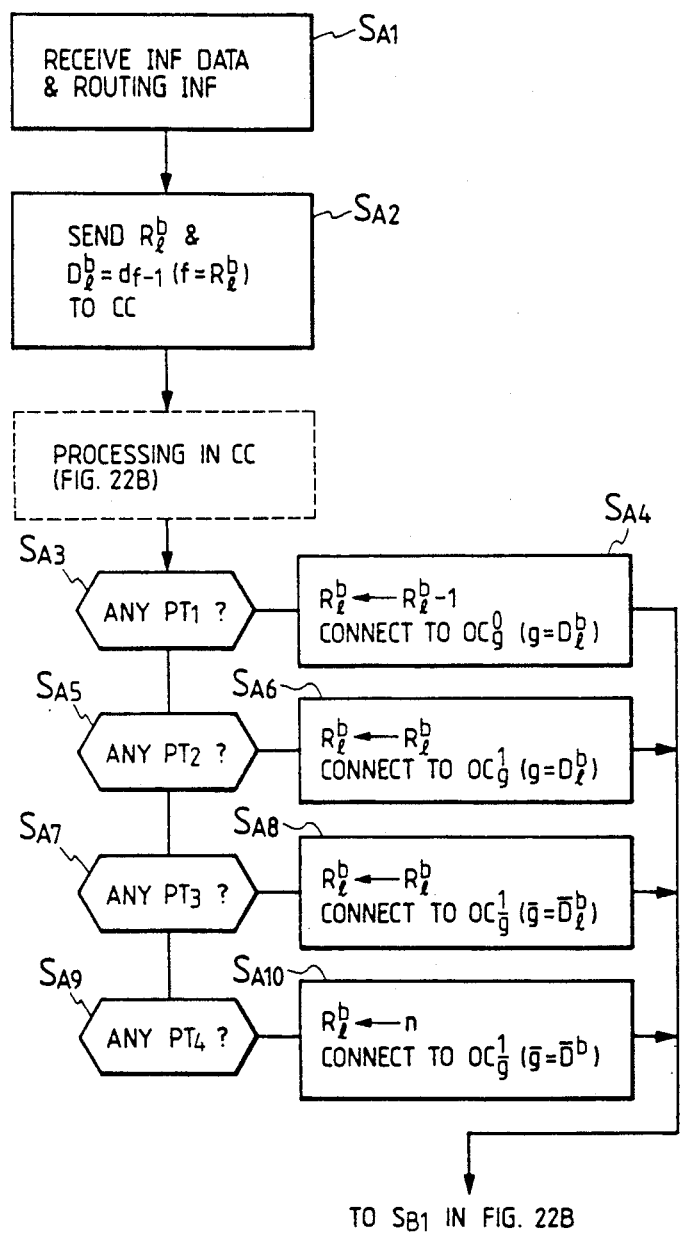
FIG. 22A is a flowchart showing a control operation of the input controller IC in FIG. 21.
Figure 22B:
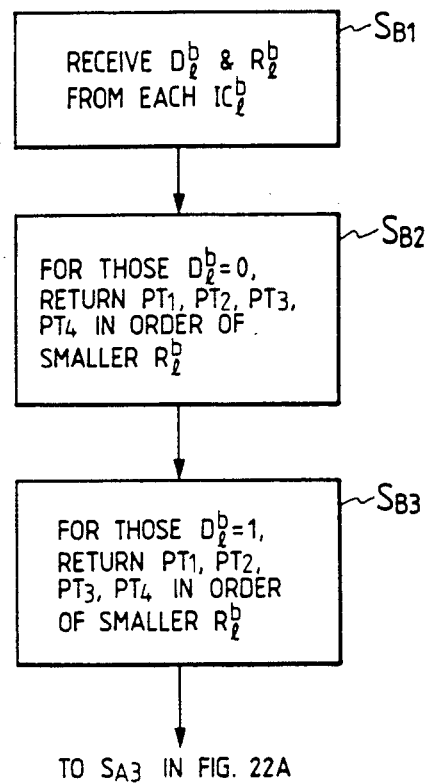
FIG. 22B is a flowchart showing a control operation of the central controller CC in FIG. 21.
Figure 22C:
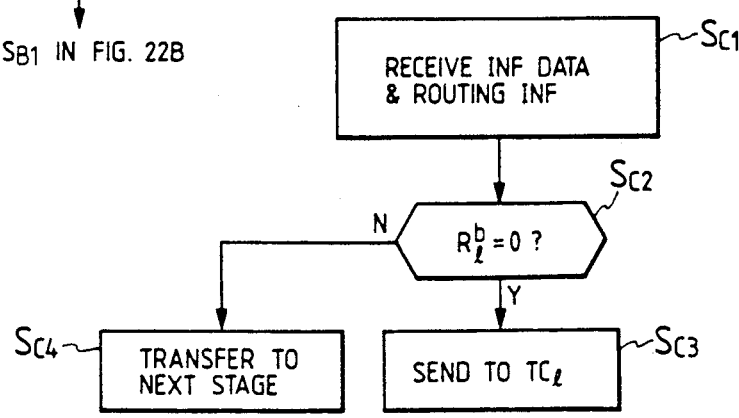
FIG. 22C is a flowchart showing a control operation of the output controller OC in FIG. 21.

Referring next to FIGS. 22A, 22B and 22C, the operation of the switching element $E_{j,i}$ of FIG. 21 will be described.

FIG. 22A shows the control algorithm in each input controller $IC_l^p$. In step $S_{A1}$ the input controller fetches the remaining judge times $R_l^p$ and the destination address from routing information of information data received from the link $L_{j,2i+l}^p$ (where $l=0$ or 1) and in step $S_{A2}$ selects, as the judge bit $D_l^p$, that bit $d_{f-1}$ (where $f=R_l^p$) which is specified by the remaining judge times $R_l^p$, and sends it to the central controller CC, together with the remaining judge times $R_l^p$.

In step $S_{B1}$ the central controller CC receives the judge bit $D_l^p$ and the remaining judge times $R_l^p$ and in step $S_{B2}$ returns, for all information data each having the judge bit $D_l^p=0$, pattern signals $PT_1, PT_2, \ldots$ in ascending order of the remaining judge times $R_l^p$ to the input controllers $IC_l^p$ which sent out those remaining judge times $R_l^p$. Next in step $S_{B3}$ the central controller CC returns, for all information data each having the judge bit $D_l^p=1$, the pattern signals $PT_1, PT_2, \ldots$ in ascending order of the remaining judge times $R_l^p$ to the input controllers $IC_l^p$ which sent such remaining judge times $R_l^p$. Upon completion of returning the pattern signals, the process shifts to a processing step $S_{A3}$ of each input controller $IC_l^p$ shown in FIG. 22A.

In steps $S_{A3}$ through $S_{A10}$ each input controller $IC_l^p$ identifies which of the pattern signals $PT_1, PT_2, PT_3$ and $PT_4$ has been returned thereto from the central controller CC, and processes the remaining judge times $R_l^p$ according to the identified pattern signal and then outputs the information data to a predetermined output controller $OC_l^p$ in a manner similar to steps $S_{A9}$ to $S_{A16}$ in FIG. 17A. This is followed by the processing operation of the output controllers $OC_l^p$, i.e. $OC_0^0$ and $OC_1^0$, shown in FIG. 22C.

Each output controller $OC_l^p$ fetches the remaining judge times $R_l^p$ from routing information of the information data received from the input controller $IC_l^p$ in step $S_{C1}$ and, in step $S_{C2}$, determines whether or not the remaining judge times $R_l^p$ is 0. If $R_l^p = 0$, then the process proceeds to step $S_{C3}$, in which the output controller outputs the information data to the contention controller $TC_l$, from which it is sent toward the intended output line via the through link $Z_{j+1,2i+l}$. If it is determined in step $S_{C2}$ that $R_l^p \neq 0$, then the output controller sends the information data to the next switching stage via the substitute link in step $S_{C4}$. Since the remaining judge times $R_l^p$ of information data which is input from an arbitrary input controllers $IC_l^p$ into either output controller $OC_l^1$, i.e. $OC_0^1$ or $OC_1^1$, is limited to $R_l^p \geq 2$ by the processing in FIG. 22B and the processing in steps $S_{A3}$ through $S_{A10}$ in FIG. 22A, the output controller $OC_l^1$ unconditionally sends information data input thereinto to the next switching stage via the equivalent link.

Figure 23:
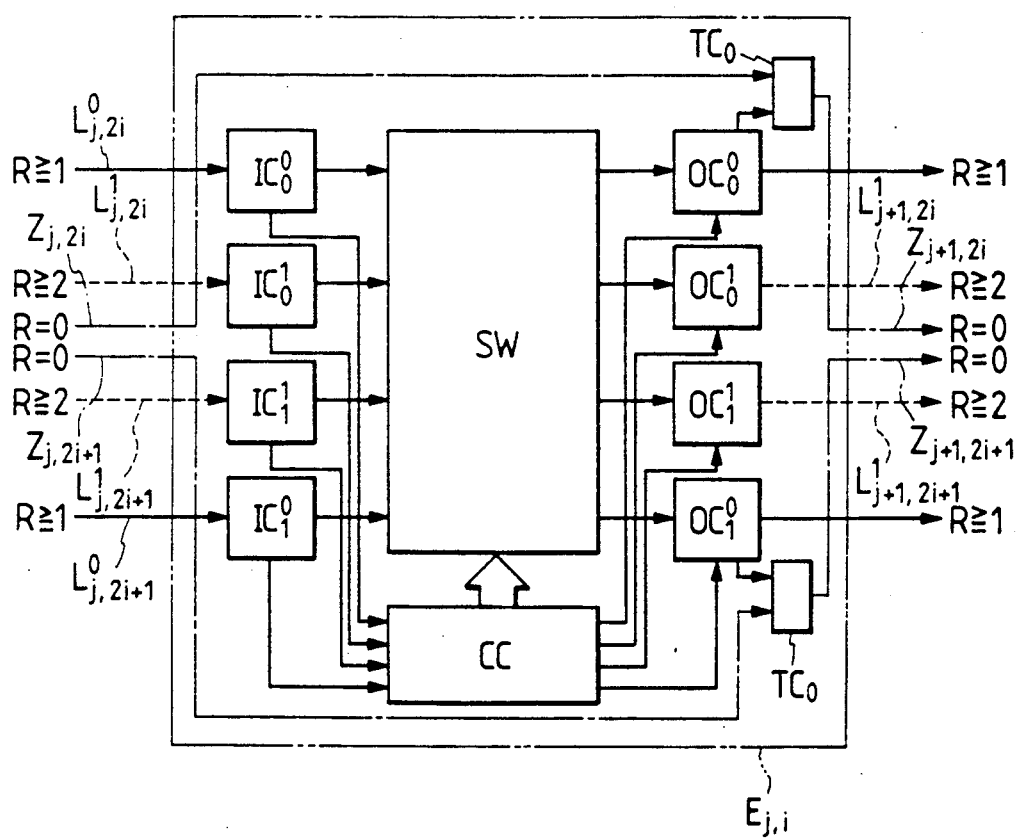
FIG. 23 is a block diagram illustrating another example of the structure of each switching element $E_{j,i}$ in FIG. 20.

The switching element $E_{j,i}$ depicted in FIG. 21 is arranged so that it identifies the kind of the pattern signal returned from the central controller CC and transfers the information data input into each input controller $IC_l^p$ to the output controller $OC_l^p$ specified by the identified pattern signal. It is also possible, however, to employ such an arrangement as shown in FIG. 23, in which a (4×4) switch SW is provided between the input controllers $IC_l^p$ and the output controllers $OC_l^p$, the connection of the switch SW is controlled by the afore-mentioned pattern signals from the central controllers CC and the updating of the remaining judge times is also performed in the output controllers $OC_l^p$ according to pattern signals which are received from the central controller CC.

The above embodiments should be construed as being merely illustrative of the present invention. It is also possible to produce, within the scope of the technical concepts of the present invention, a different type of switch through utilization of the prior art, for example, a switch which differs from the present invention only in the link wiring algorithm of the switching network and effects control using the destination address and the remaining judge times as in the present invention (a switch in which the switching network is constituted by providing substitute link wiring in a manner reverse from the perfect shuffle wiring and the destination address is used in ascending order of its bits, for instance).

According to the present invention, the routing information includes the remaining judge times, in addition to the destination address, and when a link contention occurs, the remaining judge times is reset so that routing is restarted at the next switching stage, and the line position of information data for which routing operation according to selective link connection has been completed is held unchanged during passage through the remaining switching stages. Accordingly, as the number of switching stages increases, the characteristic of the switch becomes closer to that of a non-block switch. Moreover, the use of the buffer for contention control will further increase the throughput.

Besides, the switch of the present invention has a number of routing paths, and hence is robust against failure in that even if a failure occurs, routing can be continued by bypassing the malfunctioning part. Furthermore, since all switching elements can use the same algorithm, the switch of the present invention is highly excellent in extensibility and hence is of wide application.

It will be apparent that many modifications and variations may be effected without departing from the scope of the novel concepts of the present invention.

What is claimed is:

1. A self-routing switch in which N input lines and N output lines are accommodated, where $N = 2^n$, n being an integer, a plurality of switching stages and first links interconnecting then are arranged between said input lines and said output lines, each of said switching stages includes N/2 switching elements, and a transfer of information data from an arbitrary one of said input lines to a specified one of said output lines via one of said switching elements in each of said switching stages is performed using routing information appended to said information data, said self-routing switch comprising:

routing information inserters provided between said input lines and a first one of said switching stages in a one-to-one correspondence relation to said input lines, for appending said information data with said routing information comprising address information of plural bits indicating a destination address of said information data and judge times information indicating a number of judge times the information data are to be subjected to judgment on selections of outgoing links in the subsequent switching stages;

routing information eliminators provided between a final one of said switching stages and said output lines in a one-to-one corresponding relation to said output lines, for eliminating said routing information appended to said information data transferred thereto;

wherein each of said switching elements of each said switching stage has two first input terminals and two first output terminals corresponding to two of line positions of said output lines and defining two of N first input terminals and two of N first output terminals of said switching stage corresponding to said two line positions, each of said first output terminals of each said switching stage corresponding to one of said line positions is connected via one of said first links to one of said first input terminals of the next switching stage corresponding to one of said line positions selected by a predetermined algorithm;

wherein each said switching element of a predetermined Kth one of said switching stages from the input line side has at least two second output terminals corresponding to two of said line positions, where $1 \leq K \leq n$, said switching elements of the (K+1)th and subsequent ones of said switching stages each have at least two second input terminals and at least two second output terminals corresponding to two of said line positions, said at least two second input terminals and said at least two second output terminals of each said switching element define two of at least N second input terminals and two of at least N second output terminals of said switching stage corresponding to two of said line positions;

second links for connecting said second output terminals of each of at least said Kth and subsequent switching stages and said second input terminals of the subsequent switching stage at respectively the same line positions;

wherein each of said switching elements in each of all said switching stages includes means for judging, based on the judge times information, which of the first and second output terminals should be selected, for judging, when the first output terminals are selected, which one of the two first output terminals should be selected based on one of the bits of said address information related to the switching stage to which said switch element belongs, for modifying the judge times information, and for transferring the information data through the selected one of the first links to the subsequent stage; and wherein each of said switching elements in each of at least the Kth and subsequent ones of said switching stages further includes means for judging, when the second output terminals are selected, which one of said at least two second output terminals should be selected base on a predetermined one of the bits of said address information, for modifying the judge times information, and for transferring the information data through the selected second link and the subsequent second links corresponding to the same line position to the second output terminal of the final switching stage corresponding to that same line position.

2. The self-routing switch of claim 1, further comprising sequence control means whereby a plurality of pieces of information data having the same address information, transferred from the same input line, are held in the sequence in which they are transferred from said same input line.

3. The self-routing switch of claim 1, wherein said Kth switching stage is nth from the input line side;

wherein each of said switching elements of said nth switching stage has two said second output terminals corresponding to two of the line positions, and each of said switching elements of the (n+1)th and subsequent said switching stages further has two said second input terminals and two said second output terminals corresponding to two of the line positions, thereby providing said switching stage with N second input terminals and N second output terminals;

wherein, letting each of the line positions 0 to (N−1) be represented by n bits in a binary form $(p_{n-1}, p_{n-2}, \ldots, p_1, p_0)$, said routing information inserters are connected to said first input terminals of said switching stage first from the input line side at respectively the same line positions $(p_{n-1}, p_{n-2}, \ldots, p_1, p_0)$;

wherein, letting each of said switching stages, except the final one of them, be represented by $\{s(n-1)+k\}$, where $s=0, 1, 2, \ldots$ and $1 \leq k \leq n-1$, said first output terminals of said $\{s(n-1)+k\}$th switching stage at the line positions $(p_{n-1}, p_{n-2}, \ldots, p_{n-k+1}, p_{n-k}, p_{n-k-1}, \ldots, p_1, p_0)$ are connected to said first input terminals of the switching stage $\{s(n-1)+k+1\}$th from the input line side at line positions $(p_{n-1}, \ldots, p_{n-k+1}, p_0, p_{n-k-1}, p_1, p_{n-k})$, which can be obtained by exchanging values of the bit positions $p_{n-k}$ and $p_0$ in the binary representation of the line positions;

wherein said second output terminals of said final switching stage at the line positions $(p_{n-1}, p_{n-2}, \ldots, p_1, p_0)$ are connected to said routing information eliminators at respectively the same line positions $(p_{n-1}, p_{n-2}, \ldots, p_1, p_0)$;

wherein said routing information inserters each determine, as said routing information, the address information and the judge times of an initial value n and appends said address information and said judge times to the information data to be transferred, and each said switching element of each said switching stage selects one of said links as an output route of said information data according to said routing information appended thereto, restructures said routing information by updating said judge times, and sends said routing information via said link to the corresponding switching element of the next stage, together with said information data;

wherein when the value of said judge times of said information data is 2 or more at the time of receiving said information data from the preceding switching stage via one of said first input terminals, each of said switching element of an $\{s(n-1)+k\}$th switching where $0 \leq s$ and $1 \leq k \leq n-1$, selects, as the output route of said information data, one of said two first output terminals depending on whether the bit value $d_{n-k}$ of n bits $(d_{n-1}, d_{n-2}, \ldots, d_{n-k+1}, d_{n-k}, d_{n-k-1}, \ldots, d_1, d_0)$ forming said destination address is 0 or 1;

wherein when the value of said judge times of said information data is 1, each said switching element of said $\{s(n-1)+k\}$th switching stage selects, as the output route of said information data, one of said two second output terminals depending on whether the bit value $d_0$ of said n bits is 0 or 1, and when receiving information data via one of said two second input terminals, said switching element selects, as the output route of said information data, one of said second output terminals at the same line position as that of said one of second input terminals; and wherein when two pieces of information data are input into any of said switching elements of each said switching stage, if said two pieces of information data are not in contention for the same one of said first output terminals, said switching element decrements by one the value of said judge times appended to each of said two pieces of information data and transfers them to selected ones of said first output terminals, and when said two pieces of information data are in contention for the same one of said first output terminal, said switching element resets to said initial value n said judge times of that one of said two pieces of information data which has lost said contention, and transfers said information data having lost in said contention to the other one of said first output terminals.

4. The self-routing switch of claim 1, wherein said Kth switching stage is first from the input line side;

wherein each of said switching elements of said first switching stage further has two said second output terminals corresponding to two of said line positions, and each of said switching elements of second and subsequent ones of said switching stages has two said second input terminals and two said second output terminals corresponding to two of said line positions, thereby providing said switching stage with N second input terminals and N second output terminals;

wherein, letting line positions 0 to (N−1) be represented by n bits in a binary form $(p_{n-1}, p_{n-2}, p_1, p_0)$, said routing information inserters are connected to said first input terminals of respective said first switching stage at the line positions ($p_{n-1}$, $p_{n-2}, \ldots, p_1, p_0$);

wherein, letting each of said switching stages, except a final one of them, be represented by $\{s(n-1)+k\}$, where $s=0, 1, \ldots$ and $1 \leq k \leq n-1$, said first output terminals at the line positions ($p_{n-1}, p_{n-2}, \ldots, p_{n-k+1}, p_{n-k}, p_{n-k-1}, \ldots, p_1, p_0$) in said $\{s(n-1)+k\}$th switching stages are connected to said first input terminals of a $\{s(n-1)+k+1\}$th one of said switching stages at line positions ($p_{n-1}, \ldots, p_{n-k+1}, p_0, p_{n-k-1}, \ldots, p_1, p_{n-k}$), which can be obtained by exchanging the values of the bit positions $p_{n-k}$ and $p_0$ in the binary representation of the line positions;

wherein said second output terminals of said final switching stage at the line positions ($p_{n-1}, p_{n-2}, \ldots, p_1, p_0$) are connected to said routing information eliminators at respectively the same line positions ($p_{n-1}, p_{n-2}, \ldots, p_1, p_0$);

wherein said routing information inserters each determine, as said routing information, the address information and the judge times which has, as its initial value, a particular value corresponding to the position of the input line from which the information data to be transferred is input and the position of the output line for which the information data is destined, each said routing information inserter appends said address information and said judge times to the information data to be transferred, each said switching element of each said switching stage determines one of said links as an output route of said information data according to said routing information appended thereto, update the value of said judge times in said routing information, and sends said routing information via said determined link to the corresponding switching element of the next switching stage, together with said information data;

wherein when the value of said judge times of said information data is 2 or more at the time of receiving said information data from the preceding switching stage via one of said first input terminals, each said switching element of said $\{s(n-1)+k\}$th switching stage selects, as the output route of said information data, one of said two first output terminals depending on whether the bit value $d_{n-k}$ of n bits ($d_{n-1}, d_{n-2}, \ldots, d_{n-k+1}, d_{n-k}, d_{n-k-1}, d_1, d_0$) forming said destination address is 0 or 1;

wherein when the value of said judge times is 1, each said switching element of said $\{s(n-1)+k\}$th switching stage selects, the output route of said information data, one of said two second output terminals depending on whether the bit value $d_0$ of said n bits is 0 or 1, and when receiving information data via one of said second input terminals, each said switching element selects, as the output route of said information data, that one of said two second output terminals at the same line position as that of said one second input terminal;

wherein when two pieces of information data are input into any of said switching elements of said switching stage, if said two pieces of information data are not in contention for the same output terminal, said switching element decrements the values of their judge times by one and transfers them to different output terminals which have been selected, and when said two pieces of information data are in contention for the same output terminal, said switching element resets the judge times of the information data which has lost said contention to said initial value n, and transfers it to one of said two first output terminals of said switching element which is different in position from said same output terminal.

5. The self-routing switch of claim 3, wherein each of said switching elements forming each of said nth and subsequent switching stages comprises: two input controllers connected to said first input terminals; a central controller which receives from each of said two input controllers said routing information appended to said information data, determines its output route and indicates it to each said input controller; two output controllers each of which receives said information data sent from said input controllers in accordance with said determined output route and outputs said information data to one of said first and second output terminals; and two contention controllers which are connected to said second input terminals and said two output controllers, and each of which when said information data from said second input terminal and said information data from said one output controller are in contention, selects either one of said two pieces of information data through contention control for output to said second output terminal.

6. The self-routing switch of claim 4, wherein each of said switching elements forming each said switching stage comprises: two input controllers connected to said two first input terminals; a central controller which receives from each of said two input controllers said routing information appended to said information data, determines its output route and indicates it to each said input controller; two output controllers each of which receives said information data sent from said input controllers in accordance with said determined output route and outputs said information data to one of said first and second output terminals; and two contention controller which are connected to said two second input terminals and said two output controllers and each of which when said information data from one of said second input terminal and said information data from one of said output controllers are in contention, selects either one of said two pieces of information through contention control for output to said one of said two second output terminals.

7. The self-routing switch of claim 5 or 6, wherein when it is detected from the routing information of two pieces of information data input into said two input controllers that they are to select the same one of said output controllers as their output routes, said central controller compares the values of judge times in the routing information of said two pieces of information data and, when these values are different, determines that either one of them wins according to the magnitude of the values.

8. The self-routing switch of claim 5 or 6, wherein when it is detected from the routing information of two pieces of information data input into said input controllers that they are to select the same one of said two output controllers as their output routes, said central controller checks the judge times contained in the routing information of said two pieces of information data;

wherein in the case where the value of said judge times of one and the other of said two pieces of information data are 1 and 2 or more, respectively, said central controller determines that said information data with said judge times of the value 1 is to be directed to said second output terminal and said information data with said judge times of the value 2 or more is to be directed to said first output terminal; and wherein in other cases, said central controller compares the values of said judge times of said both information data and selects that one of them whose judge times is smaller in value than the judge times of the other information data.

9. The self-routing switch of claim 1, wherein said predetermined Kth switching stage is a first one of said switching stages;

wherein each said switching element of said first switching stage has two said second output terminals corresponding to two of the line positions, and each said switching element of second and subsequent switching stages has two said second input terminals and two said second output terminals, thereby providing said switching stage with N second input terminals and N second output terminals;

wherein, letting the line positions 0 to (N−1) be represented by a binary number of n bits ($p_{n-1}$, $p_{n-2}$, ..., $p_1$, $p_0$), each said routing information inserter at a line position ($p_{n-1}$, $p_{n-2}$, ..., $p_0$) is connected to one of said first input terminals of said switching element at a line position which is represented by a binary number ($p_{n-2}$, ..., $p_1$, $p_0$, $p_{n-1}$) obtainable by shifting the value of the bit position $p_{n-1}$ to the back of the bit position $p_0$ in the n bits;

wherein, letting an arbitrary one of said switching stages, except the final one, be a jth switching stage, each of said first output terminals of said jth switching stage at a line position ($p_{n-1}$, $p_{n-2}$, ..., $p_0$) is connected to one of said first input terminals of a (j+1)th one of said switching stages which has a line position represented by a binary number ($p_{n-2}$, ..., $p_1$, $p_0$, $p_{n-1}$) obtainable by shifting the value of the bit position $p_{n-1}$ to the back of the bit position $p_0$;

wherein each of said second output terminals in the line position ($p_{n-1}$, $p_{n-2}$, ..., $p_1$, $p_0$) in said final switching stage is connected to said routing information eliminator at the same line position ($p_{n-1}$, $p_{n-2}$, ..., $p_1$, $p_0$);

wherein each said routing information inserter determines as routing information, address information indicating the destination address and the judge times of the initial value n and appends said routing information to information data to be transferred;

wherein when the value of said judge times in said routing information appended to said information data is 0, each said switching element which received said information data selects one of said two second output terminals as the output route of said information data and maintains the value of said judge times information unchanged at 0;

wherein when the value of said judge times is 1, each said switching element which received said information data refers to the value of the bit position $d_0$ in the n bits of said destination address in said routing information, and if the value of the bit position $d_0$ is 0, said switching element selects one of said second output terminals, as the output route of said information data, and if the value of the bit position $d_0$ is 1, said switching element selects the other one of said second output terminals and decrements the value of said judge times to 0, and when the value of said judge time is 2 or more, said switching element refers to the value of the bit position $d_{R-1}$ in the n bit of said destination address in said routing information is 0, where R is the value of said judge times, said switching element selects one of said first output terminals and if the value of said bit position is 1, said switching element selects the other one of said first output terminals and decrements the value of said judge times by one; and wherein in the case where a plurality of pieces of information data are input into any of said switching elements, if the bit information at the bit position to be judged in the n bits of said destination address in said routing information appended to each of said plurality of pieces of information data is 0 or 1, said switching element selects the output route of one of said plurality of pieces of information data in the same manner as the above case of the judge times being 0 or 1, and said switching element selects said one of said second output terminals as the output route of the other information data and maintains the value of said judge times unchanged, and for information data whose judge times has a value of 2 or more, and for which none of said second output terminals is available, said switching element selects, as the output route therefor, the other one of said first output terminals, and the value of said judge times is reset to said initial value n, thereby continuing routing.

10. The self-routing switch of claim 9, wherein each said switching element of each said switching stage includes: a plurality of input controllers, each connected to one of said plurality of input terminals; a plurality of output controllers, each connected to one of said plurality of output terminals; a switching circuit switching between said plurality of input controllers and said output controllers; and a central controller which receives routing information appended to information data input into each of said plurality of input controllers and controls said switching circuit in accordance with said routing information to control switching between said plurality of input controllers and said plurality of output controllers.

11. A self-routing switch which transfers information data from an arbitrary one of input lines to a desired one of output lines via a plurality of switching stages, said self-routing switch comprising:

a plurality of switching elements respectively having two first input terminals and two first output terminals and arranged in a matrix form, each column of said switching elements forming each of said plurality of switching stages;

substitute links whereby said first output terminals of respective said switching elements of each said switching stage and said first input terminals of respective said switching elements of the next one of said switching stages are connected in accordance with a predetermined algorithm;

two second output terminals provided in each said switching element of each of Kth to final ones of said switching stages, where K is a fixed number equal to or greater than 1;

two second input terminals provided in each said switching element of each of (K+1)th to final ones of said switching stages; and equivalent links for connecting all of said switching elements in each row in Kth and subsequent ones of said switching stages so that said two second output terminals of each said switching element in a jth column of said matrix are connected to said two second input terminals of each said switching element in a (j+1) column of said matrix where j=K, K+1, ... ;

wherein each said switching element outputs information data input thereinto to one of its output terminals on the basis of a destination address and judge times in routing information appended to said information data.

12. The self-routing switch of claim 11, wherein the numbers of said input lines and said output lines are both N, said switching element matrix has N/2 rows and at least n columns, where $N=2^n$ and n is a fixed integer equal to or greater than 1, a first one of said switching stages has N said first input terminals corresponding to N said input lines, and said final switching stage has N said second output terminals corresponding to N said output lines.

13. The self-routing switch of claim 12, wherein each said switching element of each said switching stage includes: two input controllers connected to said two first input terminals, for receiving information data from the preceding switching stage and fetching routing information from the information data; two output controllers connected to said two first output terminals for sending information data to the next switching stage; connecting means for arbitrarily connecting said two input controllers and said two output controllers; and a central controller which receives said fetched routing information from said two input controllers, instructs each of said two input controllers to update judge times of said information data input thereinto and specifies one of said two output controllers to which said information data is to be connected.

14. The self-routing switch of claim 13, wherein each said switching element in a jth, where $j \geq K$ and j is an integral variable, one of said switching stages includes selector means whereby said two second input terminals are normally connected to said two second output terminals corresponding thereto to form through paths, respectively, and when information data having judge times of a predetermined value is output from either one of said two output controllers, corresponding one of said two second output terminals is connected to said one of the two output controllers.

15. The self-routing switch of claim 13 or 14, wherein K=n.

16. The self-routing switch of claim 13 or 14, wherein K=1.

17. The self-routing switch of claim 12, wherein K=1 and wherein each said switching element of each said switching stage includes: four input controllers connected to said first and second input terminals, respectively, for receiving therethrough information data from the preceding switching stage and fetching their routing information; four output controllers connected to said first and second output terminals, respectively, for outputting therethrough information data to the next switching stage; connecting means for arbitrarily connecting said four input controllers and said four output controllers; and a central controller which receives said routing information from each of said four input controllers, instructs each said input controller to update judge times of said information data input thereinto and specifies one of said four output controllers to which said information data is to be connected.

18. The self-routing switch of claim 17, which includes: two third output terminals provided in each said switching element of Jth, where $J \geq K$, to final ones of said switching stages; two third input terminals provided in each said switching element of (J+1)th to final ones of said switching stages; and through links whereby all of said switching elements in said Jth and subsequent switching stages are connected so that said two third output terminals of each said switching element in said jth column of said matrix are connected to said two third input terminals of each said switching element in the (j+1)th column of said matrix, and wherein each said switching element in said Jth and subsequent switching stages includes selector means whereby said two third input terminals are normally connected to said two third output terminals corresponding thereto to form through paths, respectively, and when information data having judge times of a predetermined value is output from either of said two output controllers connected to said two first output terminals, corresponding one of said two third output terminals is connected to said one of two output controllers.

19. The self-routing switch of claim 17 or 18, wherein said connecting means is a wiring connection for connecting each of said input controllers to all of said output controllers.

20. The self-routing switch of claim 17 or 18 wherein said connecting means is a switching circuit for connecting each of said input controllers to desired one of said output controllers under control of said central controller.

21. The self-routing switch of claim 13 or 17, which includes a routing information eliminator connected to each of said second output terminals of said switching elements of said final switching stage, for eliminating routing information from information data which is output to corresponding one of said output lines.

22. The self-routing switch of claim 18, which includes a routing information eliminator connected to each of said third output terminals of said switching elements of said final switching stage, for eliminating routing information from information data which is output to corresponding one of said output lines.

23. The self-routing switch of claim 11, 12, 13, 17 or 18, which includes a routing information inserter connected to each of said first input terminals of said switching elements of said first switching stage, for appending routing information containing a destination address and an initial judge times value to information data from corresponding one of said input lines and inputting said information data to corresponding one of said switching element.

24. The self-routing switch of claim 12, 13 or 14, wherein, letting said j be represented by $j=\{s(n-1)+k\}$, where $s=0, 1, 2, \ldots$, and k is an integer in the range of $1 \leq k \leq n-1$, and the line positions $p=0, 1, \ldots, N-1$ of said N first input terminals and said N first output terminals of each said switching stage be represented by a binary number of n bits $p=(p_{n-1}, p_{n-2}, \ldots, p_0)$, said first output terminal at the line position $(p_{n-1}, p_{n-2}, \ldots, p_0)$ in a $\{s(n-1)+k\}$th one of said switching stages is connected by one of said substitute link to said first input terminal at the line position $(p_{n-1}, \ldots, p_{n-k+1}, p_0, p_{p-k-1}, \ldots, p_{n-k})$ in the succeeding $\{s(n-1)+k+1\}$th switching stage.

25. The self-routing switch of claim 12, 17 or 18, wherein, letting the line positions $p=0, 1, \ldots, N-1$ of said N first input terminals and said N first output terminals of each said switching stage be represented by a binary number of n bits $p=(p_{n-1}, p_{n-2}, \ldots, p_0)$, said first output terminal at the line position $(p_{n-1}, p_{n-2}, \ldots, p_0)$ in said jth switching stage is connected by one of said substitute links to said first input terminal at the line position $(p_{n-2}, p_{n-3}, \ldots, p_1, p_0, p_{n-1})$ in said (j+1)th switching stage.

26. The self-routing switch of claim 12, 13, 14, 17 or 18, wherein the number of said switching stages is at least (n+1).

27. A routing method of a self-routing switch wherein a plurality of switching stages are provided between routing information inserters respectively connected to a plurality of input lines and routing information eliminators respectively connected to a plurality of output lines, each of said switching stages comprises a plurality of switching elements each having a plurality of input terminals and a plurality of output terminals, said output terminals of said switching elements of each said switching stage and said input terminals of said switching elements of the next switching stage are connected by links to connect said switching stages to form a switch through which information data is transferred from an arbitrary one of said input lines to a desired one of said output lines in accordance with routing information appended to said information data, said routing method comprising the steps of:

(A) appending, by each of said routing information inserters, routing information containing at least a destination address and an initial judge times value to information data input into each said routing information inserter from the corresponding input line;

(B-1) determining, by each said switching element of each said switching stage, which bit of said destination address in said routing information appended to said information data input thereinto is to be selected as a judge bit on the basis of judge times information contained in said routing information;

(B-2) determining to which one of said output terminals said information data is to be output on the basis of the value of said determined judge bit and the value of said judge times information; and (B-3) updating said judge times information and outputting said information data from said determined output terminal to the corresponding link.

28. The self-routing method of claim 27, which further includes: a step of determining which information data is to be given a higher priority in the case of a link contention occurring between at least two pieces of information data in each said switching element; a step of processing said information data of higher priority in accordance with said steps (B-2) and (B-3); and a step of resetting said judge times information of the other information data of lower priority to the initial value and outputting said information data to an output terminal different from that determined in said step (B-2).

29. The self-routing method of claim 27, which further includes: a step of determining which information data is to be given a higher priority in the case of a link contention occurring between at least two pieces of information data in each said switching element; a step of processing said information data of higher priority in accordance with said steps (B-2) and (B-3); and a step of outputting the other information data of lower priority to an output terminal different from that determined in said step (B-2) without updating the judge times information of said other information data.

30. The self-routing method of claim 28 or 29, includes a step wherein when the judge times information of information data input into each said switching element of each said switching stage has a predetermined value, said information data is output, without changing said judge times information, to corresponding one of equivalent links which connect said output terminals and said input terminals between said switching stages at the same line position as that of the input terminal of each said switching element to which said information data was input.

31. The self-routing method of claim 28 or 29, which includes a step wherein when the judge times information of information data input into each said switching element of each said switching stage has a predetermined value, said judge times information is updated and said information data is output to through links which pass through said switching elements of said switching stages at the same position as that of each said switching element to which said information data was input.

32. The self-routing method of claim 28 or 29, wherein the priorities of said at least two pieces of information data are given in terms of magnitude of their judge times information.

33. The self-routing method of claim 29, wherein the judge times information in the routing information of information data which is input into each said switching element in each said switching stage is remaining judge times which indicates a minimum number of judgements for link connection which must be made in said each and subsequent switching stages.

34. The self-routing method of claim 27, which includes a step wherein each said routing information inserter assigns a series of sequence numbers to a series of information data to be connected to the same one of said output lines; and a step wherein each said routing information eliminator rearranges, in the order of said sequence numbers, said series of information data transferred thereto from the same one of said input lines.

35. The self-routing method of claim 27, wherein said switching elements in each row in a plurality of successive said switching stages, connected by said through links, each store therein sequence numbers corresponding to the sequence of respective pieces of information data to be output to the corresponding through link and outputs said pieces of information data to said corresponding through link in the order of said stored sequence numbers.

36. The self-routing method of claim 27, wherein when each said switching element judges that information data input thereinto has reached the same line position as that of the output line to which said information data is to be output, said switching element outputs said information data to an equivalent link which connects those output and input terminals of said switching stages which are the same in line position as said output line.

37. The self-routing method of claim 28, wherein the judge times information in the routing information of information data which is input into each said switching element in each said switching stage is remaining judge times which indicates a minimum number of judgements for link connection which must be made in said each and subsequent switching stages.

38. The self-routing method of claim 37, wherein the numbers of said input lines and said output lines are both N, where $N=2^n$, n being an integer equal to or greater than 1, and wherein, letting the remaining judge times of information data be represented by R and the destination address by a binary number of n bits $(d_{n-1}, d_{n-2}, \ldots, d_0)$, each said switching element of a $\{s(n-1)+k\}$th switching stage selects, as said judge bit, the bit $d_{n-k}$ or $d_0$ in the destination address depending on whether the remaining judge times R of input information data is $R \geq 2$ or $R=1$, where $s=0, 1, 2, \ldots$ and k is an integer in the range of $1 \leq k \leq n-1$.

39. The self-routing method of claim 38, wherein the initial value of said remaining judge times R is n and the updating of said judge times is a process of decrementing said remaining judge times R by one.

40. The self-routing method of claim 38, wherein, letting the line position of said input line from which said information data has been input into said switch be represented by a binary number of n bits $(a_{n-1}, a_{n-2}, \ldots, a_0)$, if $(a_h, a_{h-1}, \ldots, a_1) = (d_h, d_{h-1}, \ldots, d_1)$ for a certain integer value h, the initial value of said remaining judge times R is $(n-h)$, and the updating of said judge times is a process of decrementing said remaining judge times R by one.

41. The self-routing method of claim 37, wherein the numbers of said input lines and said output lines are both N, where $N=2^n$, n being an integer equal to or greater than 1, and letting the remaining judge times of information data be represented by R and the destination address by a binary number of n bits $(d_{n-1}, d_{n-2}, \ldots, d_0)$, the bit $d_{R-1}$ in said destination address is selected as said judge bit.

* * * * *